United States Patent
Leimbach et al.

(10) Patent No.: US 6,321,612 B1
(45) Date of Patent: Nov. 27, 2001

(54) ACTUATING MECHANISM FOR THE AUTOMATIC OPERATION OF A GEAR-SHIFT IN A TRANSMISSION

(75) Inventors: Lutz Leimbach, Schweinfurt; Thomas Wirth, Schwanfeld; Andreas Ratte, Dittelbrunn-Hambach; Alexander Horst, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/291,085

(22) Filed: Apr. 14, 1999

(30) Foreign Application Priority Data

Apr. 14, 1998 (DE) ................................. 198 16 514
Nov. 9, 1998 (DE) ................................. 198 51 464
Apr. 12, 1999 (DE) ................................. 199 16 169

(51) Int. Cl.$^7$ .................................................. F16H 59/04
(52) U.S. Cl. .......................... 74/335; 74/337.5; 74/473.1; 74/473.12; 74/473.21
(58) Field of Search ............................. 74/473.1, 473.11, 74/473.12, 473.21, 473.23, 473.24, 335, 337.5

(56) References Cited

U.S. PATENT DOCUMENTS 5,823,053 * 10/1998 Stengel et al. ...................... 74/335
5,916,326 * 6/1999 Tischer ............................... 74/335

FOREIGN PATENT DOCUMENTS

| 44 33 826 | 10/1996 | (DE) . |
| 197 13 423 | 11/1997 | (DE) . |
| 197 06 214 | 4/1998 | (DE) . |
| 0 198 114 | 10/1986 | (EP) . |
| 0 301 724 | 2/1989 | (EP) . |

* cited by examiner

*Primary Examiner*—David A. Bucci
*Assistant Examiner*—William C Joyce
(74) *Attorney, Agent, or Firm*—Cohen, Pontani, Lieberman & Pavane

(57) ABSTRACT

An actuating device for automatic operation of a gear change in a transmission that produces a change in predetermined translation ratios of the gear change transmission in any desired sequence comprises first and second drives that are in active connection with a selector shaft. The first drive is connected to the selector shaft via a guide mechanism which comprises at least one constraint guide that corresponds to a shifting path. The second drive is in active connection with the selector shaft for providing an operating force in the axial direction and an operating force in the circumferential direction of the selector shaft. The resulting movement depends on the operating position of the guide mechanism.

12 Claims, 23 Drawing Sheets

Fig. 29
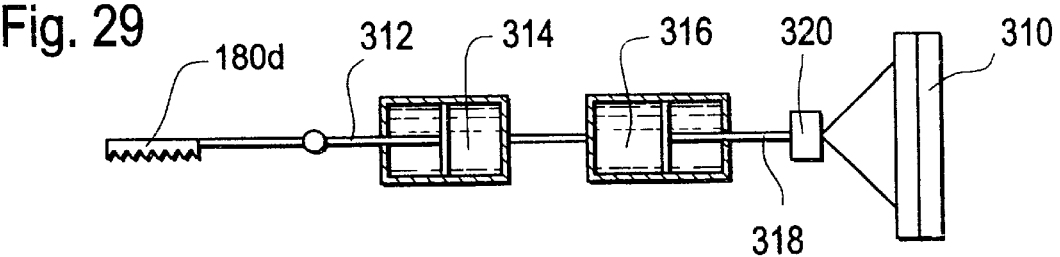
Fig. 30
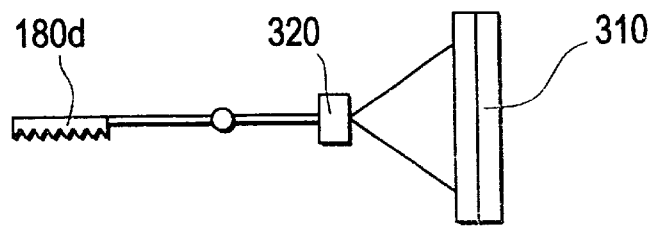
Fig. 31
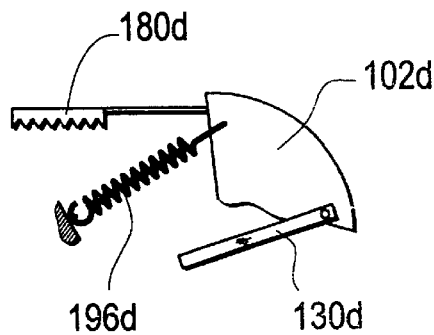
Fig. 32
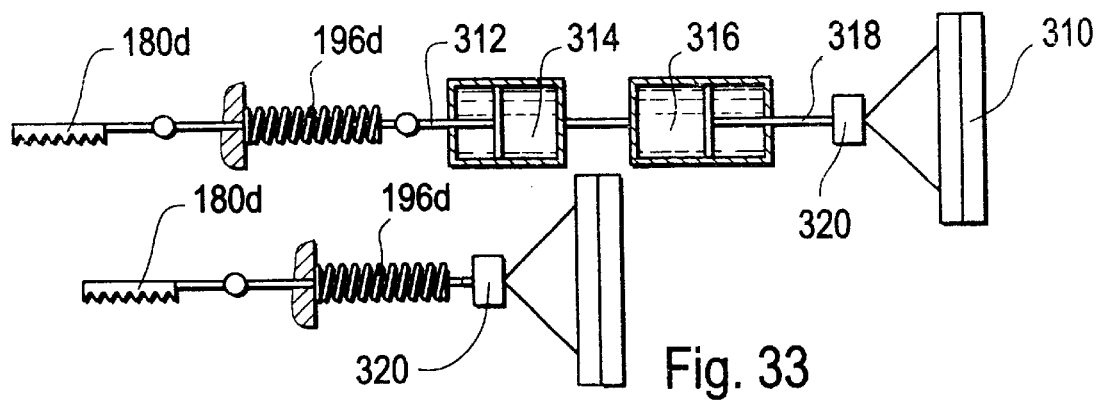
Fig. 33

ACTUATING MECHANISM FOR THE AUTOMATIC OPERATION OF A GEAR-SHIFT IN A TRANSMISSION

BACKGROUND OF THE INVENTION

1. Field of the Invention

The invention relates to an actuating mechanism for the automatic operation of a gear-shift in a transmission.

2. Description of the Related Art

Actuating mechanisms for the automatic operation of gear-change in a transmission that allow different driving gears to be selected in any desired sequence are known for example from German reference DE 197 06 214 A1. These prior art actuating mechanisms comprise a first drive for driving a selector shaft in the axial direction and a second drive for driving the selector shaft in rotary fashion. One of these two movement types corresponds to shift path selection and the other to gear selection. The association of the drives to the movement type is specific to the particular transmission. A disadvantage of this type of prior art actuating devices for the automatic operation of speed-change transmissions is that when the desired gearshift procedure involves shift path selection such, for example, as shifting from second gear to third gear in an H-shaped shifting gate, it is necessary to activate a first drive to disengage the current gear and to then slow down again to assume the neutral position. When the neutral position is reached, the second drive is activated to change the shift path position. When the desired shift path position is reached, the first drive is again activated to engage the desired driving gear. The first drive for gear selection must be powerful enough to provide the force required for synchronization. Such drives have large inertial masses, which must be accelerated or retarded during every activation or braking of the engine, resulting in reaction inertia. The large inertial mass of the first drive causes a gearshift duration experienced as disruptive by the driver when the change in gear involves a shift path selection, due to the interruption in tractive force during the gearshift procedure.

Further, the automatic operation of a gear-change in a transmission by a gear-change cylinder drivable by an associated drive is known, for example, from German reference DE 197 13 423 A1. When this prior art type of actuating device is used, the individual driving gears are activated by the gear-change cylinder in a predetermined sequence only. If the driver wishes to skip one or more driving gears, the intervening gears must nonetheless be engaged at least briefly to allow the desired gear to be engaged. As a result, greater stress is placed on the synchronization devices. Moreover, the requirement to pass through the intervening gears lengthens the time to required to implement the desired change in gear.

SUMMARY OF THE INVENTION

The object of the invention is to further develop an actuating device for the automatic operation of a gear-change in a transmission such that the time required to shift gears, especially in the case of gear shifts that involve shift path selection, is shortened for at least some of the possible gear changes.

This object is attained according to a first embodiment of the invention by an actuating device for the automatic operation of a gear change in a transmission having a plurality gears corresponding to a plurality of translation ratios, the actuating device comprising a rotatably and axially movable selector shaft operatively connectable to the transmission for selecting one of the plural gears, a first drive is operatively connected to said selector shaft via a guide mechanism, said guide mechanism comprising at least one constraint guide corresponding to a shifting path of said selector shaft for effecting a gear change between two of said plural gears, and a second drive operatively connected to said selector shaft for providing an operating force having a first force component along an axial direction of said selector shaft and a second force component along a circumferential direction of said selector shaft for urging said selector shaft along a movement path determined by an operating position of said guide mechanism.

As stated above, the actuating device comprises a first drive that is connected to the selector shaft via a guide mechanism. The guide mechanism comprises at least one constraint guide that corresponds to a shift path. The at least one constraint guide is preferably selected by the first drive. When a force is exerted on the selector shaft, the selector shaft executes a movement determined by the constraint guide. To provide the force exerted on the selector shaft for the purpose of the gear-change operation, a second drive is actively connected to the selector shaft. The resultant force exerted on the selector shaft has a component in the axial direction of the selector shaft as well as a component in the tangential direction of the selector shaft. For example, the second drive is actively connected to the selector shaft via a worm gear or a universal joint and crank gear. Because the constraint guide ensures that the selector shaft executes the actuating travel required for the desired gear change in response to a continual activation of the drive that substantially provides the operating force, the gearshift duration is shortened for a plurality of gearshift procedures. This is especially true for gearshift procedures that involve shift path selection and crossing of the neutral position.

According to a second embodiment of the invention, the aforementioned object is attained by an actuating device for the automatic operation of a gear-change in a transmission that comprises a first drive and a second drive which interact to cause a predetermined movement of the selector shaft depending on the gearshift procedure to be carried out. At least one of the two drives acts upon the selector shaft via a guide arrangement. The other drive is energized to produce an operating force to co-determine the course of the selector shaft movement with the guide arrangement.

For example, when one of the drives is activated, the guide arrangement may permit or cause the selector shaft to move in the longitudinal direction.

In addition, when the other of the drives is activated, the guide arrangement may permit or cause the selector shaft to move in both the longitudinal direction and a rotional direction.

It has proved advantageous for the guide arrangement to comprise at least two constraint guides. A first constraint guide corresponds to a gearshift procedure without shift path selection and a second constraint guide corresponds to a gearshift procedure with shift path selection. The first drive can select either of the two constraint guides, so that when an operating force is initiated by the second drive, the selector shaft executes a movement consistent with the selected one of the constraint guides.

It has also proved advantageous to activate the first drive during the gearshift procedure such that the constraint guide executes a movement during the gear-change operation to permit a movement of the selector shaft that deviates from the movement determined solely by the constraint guide.

The movement caused by the first drive is superimposed with the movement determined by the constraint guide to cause the selector shaft to move in a desired shifting movement.

Further, it has proved advantageous to have one of the constraint guides to correspond to a shifting movement from second gear to third gear and from fourth gear to fifth gear, because these gear changes occur frequently during normal driving operation.

An advantageous embodiment of a guide arrangement comprises an input part and an output part. The input part is drivable by the first drive. The output part is securely connected to the selector shaft and is preferably embodied in a single piece with the selector shaft. The desired one of the constraint guides may be activated by moving the input part relative to the output part. The input part and the output part are in an engaged arrangement with each other, as a result of which the first drive is connected to the selector shaft.

It has also proved advantageous for the guide arrangement to have a slot into which a projection engages. By means of such a slot connection, an active connection between the input part and the output part of the guide mechanism may be established in an economically producible design.

Moreover, it has proved advantageous for the guide arrangement to have a slot, preferably a closed slotted guideway, in which the aforementioned projection can remain for the purpose of selecting the constraint guide corresponding to the desired driving gear. The projection such, for example, as a bolt engages the slotted guideway. A first section of the guideway corresponds to a first constraint guide and a second section of the guideway corresponds to a second constraint guide. By activation, the projection is positioned relative to the slot at a selected one of the constraint guides. Upon initiation of an operating force, the projection passes through the selected constraint guide. It is also possible to select the desired constraint guide by a projection that is moved outward. In this case, the constraint guides do not need to be connected to each other via a slotted guideway.

As explained above, the present invention seeks to allow gearshift procedures in transmission to be carried out as quickly as possible. To fulfill this requirement to an even greater extent, according to a further aspect, the present invention has an actuating element, especially for an automated transmission. The actuating element comprises an actuating element drive, which produces an operating force for an part to be operated, as well as a supporting spring force production unit, which produces a supporting force that supports the actuating element drive during operation of the aforementioned part.

This type of actuating element is known, for example, from German reference DE 44 33 826 C2. This reference discloses a known actuating element with an actuating element drive in the form of a driving motor which acts on a segment gear. The segment gear is actively connected to an output element such, for example, as a piston rod of an input cylinder. The movement of the segment gear is supported by a compensation spring, which is stressed during the movement of the segment gear in one direction and then relaxed during its movement in the opposite direction. Such an arrangement is advantageous, for example, for use with automatic couplings, when it is necessary, during the disengagement process, to work against the force of a diaphragm spring. In this case, the compensation spring provides a supporting force. During the engagement process, the diaphragm spring of the coupling relaxes again, and thereby contributes to the force stressing the compensation spring. However, when an operating force must be produced in both movement directions, it is not advantageous to use such an arrangement in connection with the parts to be pressurized, because the actuating element drive would have to work, in at least one movement direction, against the force of the compensation spring.

A European reference EP 0 198 114 B1 discloses an actuating element with which, in particular, gearshift procedures in transmissions may be quickly undertaken. The actuating element comprises a driving motor which moves a gear rack linearly via a gearwheel connection. The linear movement of the gear rack stresses a spring in preparation for a gearshift procedure, but the spring is held initially in the stressed state by an arresting mechanism. When the gearshift procedure is to be carried out, the arresting mechanism is released, and the spring relaxes for pressurizing the part to be operated. Thus, in this known actuating element, the operating force is produced solely by the prestress of the spring. The actuating element drive is not operated during implementation of the shifting procedure itself. In the device of this prior art reference, control of the gearshift procedure is not possible. The chronological process of the gearchange is determined solely by the relaxation characteristic of the spring.

European reference EP 0 301 724 B1 also discloses an actuating element embodied to act upon the selector shaft of a transmission. In this case, a driving motor with a driving gearwheel or the like and a spring arrangement that acts in multiple steps are connected in series. When a gearshift procedure is implemented, the driving motor is energized and acts on the spring arrangement so that the latter is initially stressed when the counterforce acting on the selector shaft will not yet allow a gearshift procedure to be implemented. Not until the counterforce decreases and is overcome by the prestress force of the spring will the spring, too, relax and operate the selector shaft. In other words, in this arrangement, too, the gearshift process is carried out substantially by relaxation of the spring arrangement, and the problem again exists that precise control of the chronological process is not possible.

To counteract these problems, an actuating element according to the present invention, especially for an automatic transmission, comprises an actuating element drive, which produces an operating force for a part to be operated, and a supporting spring force production unit, which produces a supporting force that supports the actuating element drive during operation of the aforementioned part.

Further, the actuating element according to the invention has a prestress arrangement, which changes the prestress state of the supporting spring force production unit before production of the operating force by the actuating element drive.

Thus, the essential characteristic of the present invention is that when operating processes are implemented, the supporting spring force production unit and the actuating element interact, so that it is possible, by suitable activation of the actuating element drive, to substantially determine the chronological course of the operating process by the actuating element. This is especially advantageous in the implementation of gearshift procedures in an automatic transmission. Furthermore, according to the invention, the prestress state of the supporting spring force production unit is changed so that its prestress force is increased before an operating process is implemented. Therefore, the supporting force to be produced to support the actuating element drive may be adjusted as desired. As a result, the force required to be produced by the actuating element itself may be reduced. That is, the actuating element drive can have smaller dimensions or, when the prestress is strengthened, a clearly higher output force of the actuating element can be provided. Because of this, operating processes may also be carried out significantly faster.

These advantages can be enjoyed especially when the actuating element according to the invention is used as the first and/or second drive described above.

The actuating element according to the invention may, for example, comprise a drive element movable by the actuating element drive and connected or connectable via an output element to the part to be operated. Moreover, the supporting spring force production unit can act upon the drive element during production of the supporting force.

When the actuating element according to the invention is used to operate an automatic transmission in which a part to be operated is substantially moved back and forth between two positions, it is advantageous for the drive element to be substantially movable by the actuating element drive in the area between two end position regions and for the supporting spring force production unit to be movable into a prestress position in which the supporting spring force production unit can produce a supporting force to move the drive element out of its position by the prestress unit associated at least with each end position region of the drive element.

For example, the actuating element according to the invention can be embodied in such a way that the supporting spring force production unit acts with a first end region on the drive element or a component connected thereto and rests with a second end region on a component that preferably remains substantially stationary during implementation of operating processes at least in a preparatory state for supporting force production. At least one end region of the supporting spring force production unit, preferably the second end region, is movable for changing the prestress.

In one embodiment, the supporting spring force production unit comprises an axial force spring, preferably a helical compression screw or the like, that pivots to change the prestress.

Alternatively or in addition, the supporting spring force production unit may comprise an axial force spring, preferably a helical compression screw or the like, with a spring longitudinal axis. To change the prestress, the second end region can be moved substantially in the direction of the spring longitudinal axis toward the first end region, or vice versa.

To minimize the structural space required for the actuating element according to the invention, it is proposed that the given end region or axial force spring be movable substantially on a plane of motion whereon the drive element can be moved by means of the actuating drive, or on a plane substantially parallel to the aforementioned plane.

In a further alternative embodiment, the supporting spring force production unit comprises a rotary force spring, preferably a torsion spring, spiral spring or the like, with a spring longitudinal axis, and the second end region, to change the prestress, relative to the first end region, is movable or rotatable around the spring longitudinal axis.

A simple structure that uses the principle of the present invention is attained when the drive element is pivotable by the actuating element drive around a rotational axis, and the first end region of the supporting spring force production unit acts on the drive element eccentrically relative to the rotational axis.

Moreover, when an axial force spring is used, for example, the prestress unit may comprise an abutment element pivotable by a prestress drive around an axis, preferably the rotational axis of the drive element, that is eccentric to the action area of the first end region on the drive element. The second end region rests on the abutment element.

Alternatively, in connection with an axial force spring, the prestress unit may comprise at least one cover disk element pivotable by a prestress drive around the rotational axis. In this case, the drive element and cover disk element(s) have at least one spring recess for supporting an axial force spring, preferably a helical compression spring or the like, with its two end regions. This structure corresponds approximately to that of torsional vibration dampers used, for example, in coupling disks or two-mass flywheels, with at least one cover disk element and one center disk element, which are movable relative to each other.

The present invention further relates to a process for producing an operating force by an actuating element, which process encompasses the following steps:
a) causing a supporting spring force production unit to be placed into a prestressed state during a phase of operation in which no operating force is to be produced by the actuating element;
b) driving an actuating element drive to produce a basic operating force during a phase in which an operating force is to be produced, such that a supporting force supporting the actuating element drive is produced by the relaxation of the supporting spring force production unit from its prestressed state.

When a part of an automatic transmission is to be operated by the operating force, it is advantageous to perform step a) when the need to implement a gearshift procedure in the transmission is detected, and before a coupling associated with the transmission reaches the disengagement position required to implement the shifting process.

To further attain the object of the invention, there is provided an actuating element for operating a part to be operated, comprising an output element movably arranged for moving in response to a release of an operating force, an actuating drive operatively connected to said output element for generating said operating force and moving said output element, said actuating drive comprising an energy storage device for storing a stored energy, said stored energy being convertible into at least a portion of said operating force for moving said output element, and said energy storage device being operatively arranged for absorbing said storage energy at any operating position and any operating state of said output element.

Further, according to the invention, the energy storage device has the ability to absorb storage energy regardless of which operating position and/or which operating state the output element is in.

An actuating element embodied in this manner and having a precharged and rechargeable energy storage device enables rapid coupling procedures and allows for clutches to be operated directly by energy taken from the energy storage device. In all cases, the coupling time is reduced. Moreover, because the process of charging the energy storage device is independent of the movement state or operating position of the output element, the spectrum of use and functionality of such actuating elements, compared with actuating elements known from the prior art, is clearly improved.

For example, it is possible for the energy storage device to have associated with it a charging arrangement for transporting energy to the energy storage device. Particularly when the charging arrangement comprises a charging drive, preferably an electric motor charging drive, the energy storage device can be recharged simply and reliably when necessary, so that one or more operating procedures can subsequently be carried out. Such an arrangement is especially suitable when the actuating element is used with an automatic transmission, with which multiple operating procedures can be carried out relatively quickly, one after the other, and whereby different operating directions respectively require energy delivered from the energy storage device.

The energy storage device used with the actuating element according to the invention can comprise, for example, a storage device selected from the group consisting of a spring energy storage device comprising at least one elastically deformable element stressable for storing said stored energy, a centrifugal mass arrangement placable into motion for storing said stored energy, a pressurized fluid storage arrangement pressurizable for storing said stored energy, an electric accumulator arrangement chargeable for storing said stored energy, an electrostatic storage arrangement chargable for storing said stored energy, a chemical storage arrangement, and a thermal storage arrangement.

It is clear that any type of energy storage device may be used to allow subsequent retrieval from the storage device of potential energy convertible into movement energy.

Further, in the case of the actuating element according to the invention, the energy storage device is preferably charged whenever the energy stored therein falls below a predetermined limit value or limit value range. In this way, it can be ensured that the energy stored in the energy storage device does not fall below the predetermined limit value. This guarantees, in particular, that tolerances and time delays can be compensated for when the charging drive is activated, and that emergency operation is possible. In addition, multiple shifting procedures can be carried out, one after the other, without the energy storage device having to be charged in between.

To convert the energy stored in the energy storage device into operating energy, it is proposed that a transmitting or transporting arrangement be provided to convert energy stored in the energy storage device into movement of the output element.

For example, this transporting arrangement may comprise a gear arrangement, whereby the gear arrangement preferably comprises an input area, which is in or can be brought into transport connection with the energy storage device, and an output area, which is in or can be brought into transport connection with the output element.

To interrupt or to allow a flow of energy to the output element, as desired, it is proposed that at least one coupling element be arranged between the energy storage device and the output element to selectively interrupt or establish the flow of energy from the energy storage device to the output element.

Particularly when used in conjunction with an automatic transmission, it is advantageous, for the purpose of producing the various movement states induced or supported by the energy storage device, for the transporting arrangement (which produces the various movement states of the output element) to comprise multiple transport paths for transporting energy from the energy storage device to the output element.

In this case, it is preferable that each of the transport paths have at least one coupling arrangement.

Further, it is possible for the energy storage device to have a plurality of storage areas. This allows the storage capacity of the energy storage device to be easily enlarged.

Moreover, this embodiment has the advantage that energy can be transported from different energy areas to the output element for the purpose of producing different movement states of the output element.

As already explained, it is possible for the output element to be placed into motion using only the energy released from the energy storage device. Alternatively, however, a movement drive may also be provided that supplies energy to the output element for the purpose of moving it. In this case, the energy released from the energy storage device thus serves merely to support or supplement the energy supplied by the movement drive.

Preferably, the movement drive comprises an electric motor drive and/or a fluidoperated drive.

A structure that mechanically integrates multiple functions into one component group is obtained when the energy storage device can be brought, by energization of the movement drive, into an energy transport connection with the output element.

This type of structure is realized when a transport element that transports energy from the movement drive to the output element and/or the output element itself is moved in response to energization of the movement drive, for the purpose of establishing an energy transport connection between the energy storage device and the output element.

Preferably, the transport element comprises a segment gear pivotable around a first axis by the movement drive. When the movement drive acts upon the segment gear, the latter is pivoted around and/or moved along a second axis to establish an energy transport connection between the energy storage device and the output element.

The structure of the actuating element according to the invention can be further simplified when the movement drive encompasses the charging drive.

If, with the actuating element according to the invention, a gear arrangement is provided for the purpose of establishing an energy transport connection between the energy storage device and the output element(s), this gear arrangement may comprise a rotatably mounted driving gear rotatable under an urgency of said energy storage device or with said energy storage device, a first transmitting gear in driving connection with the driving gear, an output gear; and a first coupling arrangement comprising a first coupling element connected between said output gear and said first transmitting gear for selectively establishing or interrupting a connection between said output gear and said first transmitting gear.

For example, the first transport gear may be rotatably mounted on a shaft but in an axially substantially fixed manner. In addition, the output gear and/or a coupling element of the coupling arrangement may be connected in rotation-proof fashion to the shaft.

Particularly in an embodiment wherein different operating directions of the output element are required, it is possible to provide a second transport gear, which is in driving connection with the driving gear and which can be brought, by means of a second coupling arrangement, into driving connection with the output gear or with a further output gear.

The structure may be arranged such that the second transport gear is driveable by the driving gear in a rotational direction opposite to a rotational direction of the first driving gear.

Further, in a very simple structure, the second transport gear may be mounted on the shaft rotatably but in an axially substantially stationary fashion, and the output gear and/or a coupling element of the second coupling arrangement may be connected in rotation-proof manner to the shaft.

When a coupling arrangement is used, it is possible, for the purpose of ensuring that it can be brought into the desired state, to provide an operating part, which is driven by an operating drive and can itself drive the coupling arrangement(s).

It is also possible for the operating drive to encompass the movement drive. In this way, the structure of the actuating element according to the invention is further simplified.

In a preferred embodiment, it is possible, by means of the operating drive, to drive to rotation an operating part engaged with a segment gear, whereby the rotation of the operating part leads to a displacement of the operating part. The displacement of the operating part can activate the coupling arrangement(s) for selectively establishing or dis-establishing the transport connection between the energy storage device and the output element. In this case, the movement of the output gear is preferably transmitted to the segment gear.

Because, in the actuating element according to the invention, the energy storage device can be charged independently of the control of the actuating element itself, care should be taken to ensure that energy stored in the energy storage device is only released when the performance of an operating procedure is desired. To this end, it is proposed that, in addition, a blocking device be provided, via which the energy storage device is blocked from releasing energy. For example, the transport arrangement may include the blocking device. To block the energy flow from the energy storage device to the output element, for preventing the energy storage device from releasing energy, it is possible to bring all of the coupling arrangements associated with the different transport paths into a disengaged state. Alternatively, it is possible, for preventing the energy storage device from releasing energy, to bring all of the coupling arrangements associated with the various transport paths into an engaged state.

Particularly for the purpose of operating a friction clutch, it is advantageous for the energy storage device to also encompass a compensation force production arrangement.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIGS. 7a–7e show a chronological progression of a gearshift procedure using an actuating element according to the present invention, wherein:

FIG. 7a is the time curve of the engine output moment;

FIG. 7b shows the disengagement state of the coupling;

FIG. 7c shows the state of implementation of a preselection process;

FIG. 7d shows the amount of movement along a shifting path of a part of a transmission moved during implementation of the gearshift procedure; and FIG. 7e shows the prestressed state of a supporting spring force production arrangement in the actuating element;

FIGS. 29–33 each show a different embodiment of a coupling of an actuating element to a unit to be operated.

DETAILED DESCRIPTION OF THE PRESENTLY PREFERRED EMBODIMENTS

Figure 1:
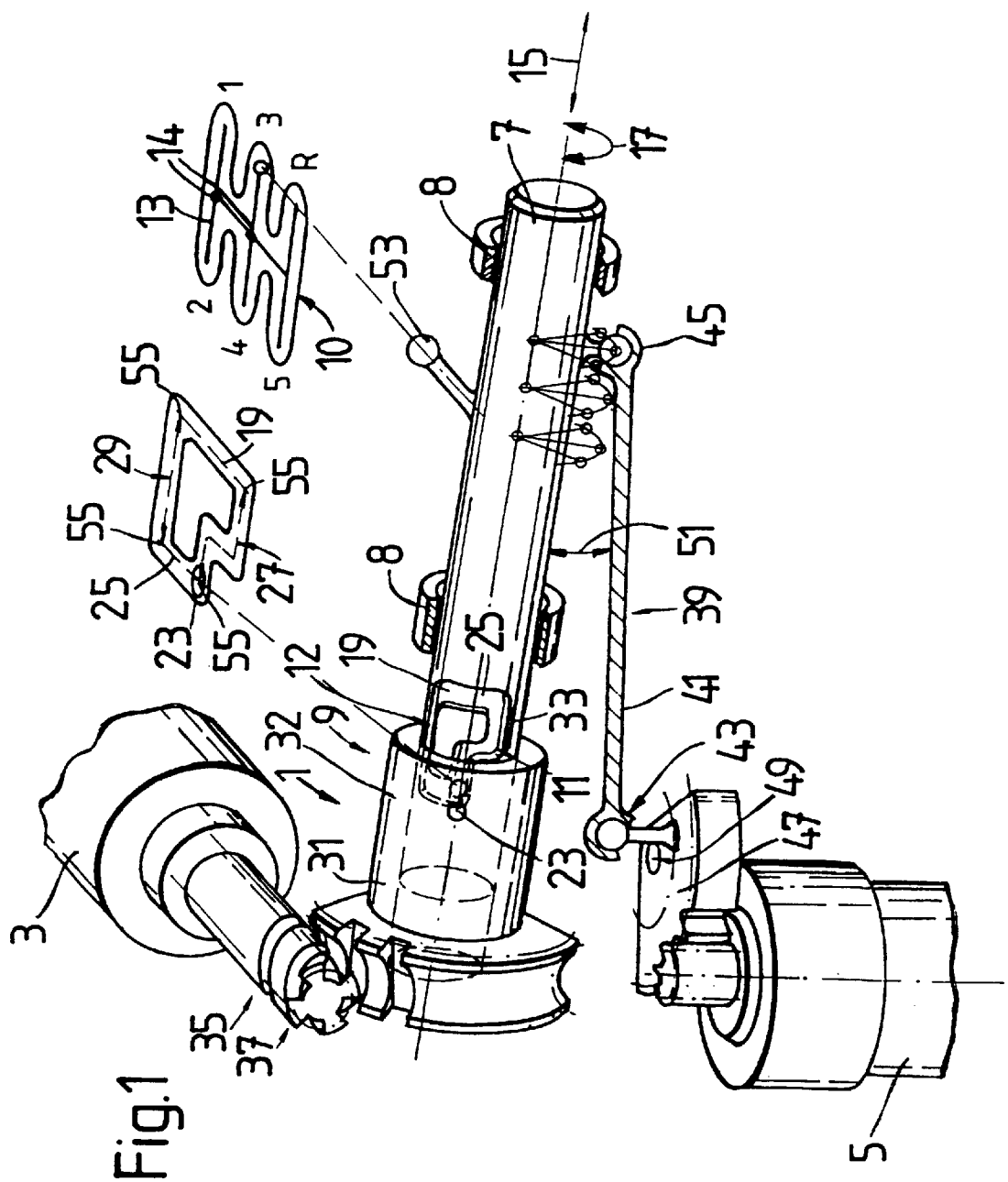
FIG. 1 shows an actuating device according to an embodiment of the present invention for the automatic operation of a gear-change in a transmission with two constraint guides selectable for a gearshift procedure.

In FIG. 1, an actuating mechanism 1 according to the present invention comprises a first drive 3 connected to a selector shaft 7 via a transmission 35. In FIG. 1, the transmission is a self-locking worm gear 37. Instead of the worm gear 37, the transmission 35 may also include a multi-step gear which allows an even lower-power electric motor to be used as the drive 3. The worm gear 37 engages a gearwheel 30 mounted rotatably on the selector shaft 7 and embodied in a single piece with a sleeve 32. A projection 21 is mounted on the sleeve 32 in the form of a bolt 23. The bolt 23 engages into a slot 19 proximate one end of the selector shaft 7. The bolt 23 could also be connected to the shifting shaft 7 and engage into a slot 19 provided in the sleeve 32.

A guide mechanism 9 is used to guide the movement of the selector shaft 7 under the force supplied by a second drive 5 which will be described in more detail below. The sleeve 32 with the bolt 23 forms an input part 31 of the guide mechanism 9. The section of the selector shaft 7 equipped with the slot 19 forms the output part 33 of the guide mechanism 9.

A detailed view of the slot 19 of the guide mechanism 9 is shown in FIG. 1a. The slot 19 comprises first and second constraint guides 11, 12 and slotted guideways 25 connecting the ends of the first and second constraint guides 11, 12.

Referring to the shifting gate 81 shown in FIG. 1, a shift path is defined as a path to a gear from the neutral position 10. Therefore, there are three shift paths in the shift gate 81, the first is between gears 1 and 2, the second is between gears 3 and 4, and the third is between gears 5 and R. The second constraint guide 12 of the guide mechanism 9 permits a gear change within one shift path, such as between gears 1 and 2. The first constraint guide 11 of the guide mechanism 9 permits a gear change between two shift paths such as between gears 2 and 3. To position the projection 23 in the appropriate one of the first and second constraint guides 11, 12, the first drive 3 is activated for rotating the sleeve 32 and bolt 23 until the bolt 23 is properly aligned in the slot 19.

The second drive 5 rotatably drives a segment gear 47 about a rotational axis 49. A link rod 41 is connected to the segment gear 47 via a first joint 43 eccentrically relative to the rotational axis 49 of the segment gear 47. The other end of the link rod 41 is connected to the selector shaft 7 via a second joint 45. This link rod 41 is arranged at an angle 51 relative to the selector shaft 7. The angle 51 is between 0 and 90 degrees, so that the force transmitted to the selector shaft 7 via the link rod 41 always has a component other than zero in the axial direction 15 and in the circumferential direction 17. The force acts upon the selector shaft 7 via the second joint 45. The selector shaft 7 is mounted via the bearing 8 in a rotatable and axially movable fashion. A force acting in the circumferential direction 17 therefore results in a rotational movement of the selector shaft 7, unless the selector shaft 7 is prevented from rotating by one of the first and second constraints 11, 12 of the guide mechanism 9.

Further, the actuating device 1 has an associated control device (not shown in the Figures). The control device receives a plurality of signals characterizing the operating state of the motor vehicle. When the control device recognizes the desire to shift gears, the control device activates the first and second drives 3, 5 in a predetermined manner. For example, to shift from a first gear into a second gear, the second constraint guide 12 of the guide mechanism 9 is activated. As explained above, the second constraint guide 12 corresponds to a gearshift procedure without shift path selection. Referring to FIG. 1a, activation of the first drive 3 causes the bolt 23 to be positioned in a basic position 55b associated with the second constraint guide 12. As the alignment of projection 23 occurs, the engine of the motor vehicle is suitably controlled to prepare for the gearshift procedure while the disengagement of the friction clutch is prepared for or initiated. Once the friction clutch is disengaged or substantially disengaged, the second drive 5 is activated for the purpose of initiating an operating force to the selector shaft 7 and the segment gear 47 is placed into rotation. The segment gear 47 pressurizes the link rod 41 connected at an angle thereto with a force that is transmitted via the link rod 41 to the selector shaft 7. Due to the angle 51 between the selector shaft 7 and the link rod 41, a force in the axial direction 15 and a force in the circumferential direction 17 act via the link rod 41 on the selector shaft 7, and a torque results from the force acting in the circumferential direction.

The selector shaft 7 is mounted in an axially movable and rotatable fashion in a bearing 8. Thus, the introduced force results in a movement of the selector shaft 7 in accordance with the second constraint guide 12. Accordingly, the selector shaft 7 executes a movement in the axial direction.

For a gear change associated with a change in the shift path such, for example, as a change from second gear into third gear, the bolt 23 is positioned by activation of the drive 3 into a basic position 55c associated with the first constraint guide 11. After this, the drive 5 is activated, whereupon the bolt 23, due to initiation by the drive 5 of the force required for operation, passes through the constraint guide 11. The direction of the operating force provided by the drive 5 is determined by the direction of activation of the drive 5.

The basic positions 55a–55d of the first and second constraint guides 11, 12 are connected to each other by the slot 19 which forms slotted guideways 25. As a result, the illustrated bolt 23, while remaining in engagement with the slot 19, can assume the basic positions 55a–55d for selecting one of the first and second constraint guides 11 and 12.

For a gearshift procedure that skips at least one gear such, for example, as switching from second gear to fifth gear, the simultaneous activation of the drives results in the desired shifting movement. Similarly, in the case of a shift from second gear to fourth gear, the activation of both drives is required to provide the operating path.

The following is a description of a gearshift procedure from second gear to fifth gear. This gearshift procedure differs from the above-described shifting process from second gear to third gear essentially in that, upon passage through the constraint guide 11, the drive 3 is also activated. The actuating movement initiated by the first drive 3 results in an actuating movement of the selector shaft 7 in the shift path selection direction. To shift from second gear to fifth gear, an actuating movement of exactly one shift path position is implemented by activation of the first drive 3 and then superimposed on the movement determined by the first constraint guide 11. The second drive 5 is also activated without interruption to provide the actuating path to be travelled for shifting from second gear to fifth gear.

To shift from second gear to fourth gear, the second constraint guide 12 is preferably used. Activating the second drive 5 causes the selector shaft 7 to be moved into the neutral position 10 of the shifting gate 81 which is associated with roughly a center position of the second constraint guide 12. Once the neutral position 10 is assumed, the drive 3 is activated to initiate the required movement in the shift path selection direction or the circumferential direction 17. Given the synchronization work performed during gear engagement, only a fraction of the force needed for engagement of a gear is needed for shift path selection. Therefore, a low-power drive can be used for shift path selection. When the desired shift path position 14 is assumed, the second drive 5 is activated in the direction opposite to its first activation direction, so that the bolt 23 returns to the basic position 55a it occupied before the start of the gearshift procedure. The desired fourth driving gear is now engaged.

Figure 2:
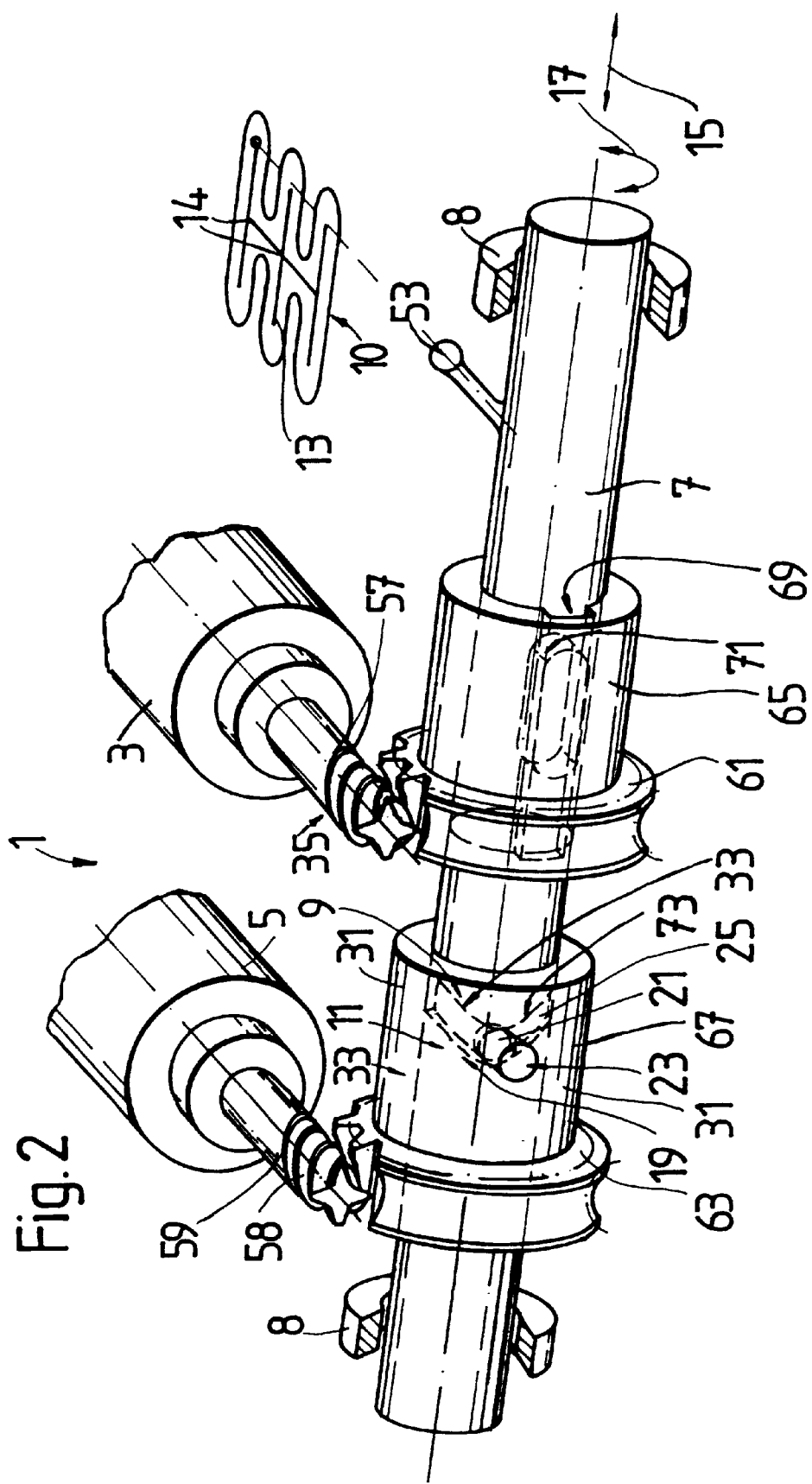
FIG. 2 shows another embodiment of an actuating device for the automatic operation of a gear-change in a transmission.

In FIG. 2, an actuating device 1' for the automatic operation of a speed-change transmission comprises two electric motors arranged parallel to each other in the form of first and second drives 3, 5. These first and second drives 3, 5 have worm drives 58 as output parts 57, 59. The worm drives 58 engage with first and second gearwheels 61, 63 that are associated with the first and second drives 3, 5 and mounted on the selector shaft 7. The first gearwheel 61 associated with the first drive 3 is connected to the selector shaft 7 in a rotation-proof but axially movable manner. A sleeve 65 with an axial recess 69 on its radially inner side is securely connected to the first gearwheel 61. A projection 71 that is securely connected to the selector shaft 7 engages the axial recess 69 to establish a rotation-proof connection between the sleeve and the selector shaft 7. It is also possible, for the purpose of establishing the rotation-proof connection, to provide engaging profiles embodied without rotational symmetry.

The second gearwheel 63 associated with the second drive 5 is mounted rotatably on the selector shaft 7. This gearwheel 63 is securely connected to a sleeve 67 which is also mounted rotatably on the selector shaft 7. A bolt 23 is mounted on the sleeve 67 that extends radially inward into a slot 19 in the selector shaft 7. After placement of the sleeve 67 on the selector shaft 7, the bolt 23 is mounted so as to extend into the slot 19. The slot 19 is embodied in an encircling fashion and has a wave profile with axial slope areas 73. The function of this actuating device is described in greater detail below.

A gear change into the next highest gear that requires a change in shift path such, for example, as a shift from second gear to third gear, is described first. Once the clutch is disengaged or substantially disengaged, the second drive 5 is activated. The sleeve 67 is driven in rotary fashion via the worm drive 58 and second gear wheel 63. As a result, the bolt 23 that engages into the slot 19 is moved in the slot 19. As mentioned above, the slot 19 comprises axial slope areas 73. The axial slope area 73 forms at least part of a constraint guide 11. The transmission 35 formed by the output part 57 and the first gearwheel 61 can be either self-locking or not self-locking. Therefore, the activation of the first and second drives must be adjusted accordingly.

In what follows, it is assumed that the transmission 35 is not self-locking. In this case, for a gear change into the next highest or next lowest gear with a shift path change, an axial slope area 73 corresponds to a constraint guide 11. Upon rotation of the second gearwheel 63 associated with the second drive 5, the bolt 23 moves in the slot 19 and rests on the limit 20 arranged in the movement direction of the bolt 23. As a result, the selector shaft 7 receives a force in the circumferential direction and a force in the axial direction. The amount of force depends on the slope of the axial slope area 73. It is possible to determine the forces acting in the axial direction 15 and the circumferential direction 17 as a function of the movement initiated via the sleeve 67 by choosing the slope of the axial slope areas 73 and taking into account the surface friction between the bolt 23 and the limit 20 of the slot 19 that contacts the bolt 23. It is also possible for the first drive 3 to be activated in supportive fashion to guarantee the actuating path required in the shift path selection direction. If the transmission between the output part 57 and the first gearwheel 61 is embodied in a self-locking manner, then the first drive 3 must be activated for each actuating movement in the shift path selection direction. A predetermined movement of the selector shaft 7 in the axial direction via the constraint guide 11 is initiated by the second drive 5. The actuating movement in the shift path selection direction that is initiated by the first drive 3 is preferably superimposed on the actuating movement initiated by the second drive 5.

For a gearshift procedure without shift path selection, a rotary movement of the selector shaft 7 is prevented or counteracted by activation of the first drive 3, which is connected in rotation-proof fashion to the selector shaft 7. For a gearshift procedure with shift path selection by more than one shift path position, a rotary movement of the selector shaft 7 is initiated by means of the first drive 3 and superimposed on the movement predetermined by the constraint guide 11. The rotational position of the constraint guide 11 is moved by the first drive 3.

To provide a shifting movement corresponding to a gear change from second gear to fourth gear, the second drive 5 is activated in a first operating direction for positioning the selector shaft 7 in the neutral position 10. Once the neutral position 10 is assumed, the first drive 3 is activated and supplies the required actuating movement in the shift path selection direction. After the correct shift path position has been assumed, the second drive 5 is activated in a direction opposite to the first operating direction for engaging the desired gear.

The functional principle of the embodiment in FIG. 2 is virtually the same as that of the embodiment in FIG. 1, despite the structural differences, and can be summarized as follows:

Two drives are provided, namely first drive 3 and second drive 5, at least one of which must be energized to produce an operating force for moving the selector shaft 7. For example, if an axial movement of the selector shaft 7 is desired, only the drive 5 is energized. In consequence, due to the interaction of the bolt 23 with the slot 19, a force is exercised on the selector shaft 7 in both the axial and the circumferential directions. If the first drive 3 is a self-locking drive, the selector shaft 7 is prevented from rotary movement by the self-locking of the first drive 3, which is not energized in this state. If the first drive is not a self-locking drive, the selector shaft 7 is prevented from rotary movement by the suitable activation of the drive 3 and/or by the movement presetting of the guide projection 53 run in the shifting gate 10 in FIG. 2. For example, let us assume that the guide projection 53 is located in the depicted end position in the first gear of the shifting gate 10. A rotational movement of the selector shaft 7 is prevented initially by means of the shifting gate 10 and the guide projection 53 engaged therein, even if the drive 3 or the transmission 35 is not self-locking or has been released. However, when the neutral position on the curve of the gearshift procedure is reached, the axial guiding characteristic of the shifting gate 10 no longer applies. To then shift through into second gear (i.e., without any movement in the shift path direction), it is necessary for the rotational movement of the selector shaft 7 to be prevented by the first drive 3 and the associated transmission 35, at least when the shift path is surpassed/exceeded. In the case of a self-locking transmission 35, such rotational movement is necessarily prevented when the first drive 3 is not being driven, because the sleeve 65 cannot rotate and because a constraint guide is provided for the selector shaft 7 in its longitudinal direction via the projection 71 engaged into the slot 69. If the transmission 35 or the drive 3 is not self-locking, then, during shifts from first to second gear (or, for example, from third to fourth gear and back), the sleeve 65 must be kept stationary (i.e., not rotated) by suitable activation or counter-drives, so that it provides the aforementioned constraint guide for the selector shaft 7.

If, when the neutral position is reached, a rotational movement of the selector shaft 7 is required for selection along the shift path, this can be accomplished by releasing the first drive 3, in the case of a non-self-locking drive 3 or transmission 35, so that, due to the elimination of the constraint guide between the shifting gate 10 and the guide projection 53, the selector shaft 7 is automatically rotated about its longitudinal axis by the circumferential force produced by the sleeve 67. After passing through the shifting path, the selector shaft 7 is moved, for example, into the position for third gear. If fifth gear is to be engaged, the movement to the shift path for the fifth gear is achieved by driving the first drive 3 and the second drive 5 synchronously when the neutral position is reached, so that the sleeve 67 and the selector shaft 7 rotate at the same rotational speed and the position of the projection 23 in the slot 19 remains unchanged while the first and second drives are operated. Initially, no axial movement of the selector shaft 7 is produced. When the shifting path position for fifth gear has been reached, further rotation prevented by stopping the first drive 3. The second drive 5 continues to be driven to produce an axial movement of the selector shaft 7.

In view of the above, when the second drive 5 is energized to produce an operating force for the selector shaft 7, the first drive 3 and/or its associated guide arrangement including the sleeve 65, depression 69, and projection 71 on the selector shaft 7, provides a constraint guide that co-determines the movement course of the selector shaft 7, at least during certain gearshift procedures or certain phases of certain gearshift procedures. In the specific case, the first drive and its associated guide arrangement determine an exclusively axial movement of the selector shaft 7. Conversely, when the first drive 3 or the sleeve 65 is activated to produce an operating force, the second drive 5 or the associated sleeve 67 with the projection 23 and the slot 19 in the selector shaft 7 acts as a constraint guide that determines how the selector shaft 7 must move in this case. In the case of the embodiment of FIG. 2, rotary driving by the first drive 3 while the second drive 5 is stationary results in both a rotary movement and an axial movement of the selector shaft 7. If only a rotational movement is desired, without an axial movement, then, as discussed above, the first and second drives 3, 5 should be driven synchronously.

The interaction of the shifting gate 10 with the guide projection 53 ensures that shifting movements of the selector shaft 7 occur in a certain pattern. Thus, even when only the second drive 5 is energized and, for example, the drive 3 is released or is not self-locking, only a movement along certain pathways determined by the gate 10 can be attained in certain states. For example, a straight-line transition from first gear to third gear could not necessarily be attempted, induced by the exclusive rotation of the selector shaft 7, starting from first gear.

It should again be pointed out that this alternating interaction of a guide arrangement of one of the drives for guiding the movement of the selector shaft 7 while the other drive is driven is not necessary and does not occur in every gearshift procedure.

This functional principle is also implemented in the embodiment in FIG. 1. There, too, when an operating force is produced by the second drive 5, the guide arrangement associated with the first drive 3 forms a unit that determines the movement pattern or movement curve in which the selector shaft 7 must move. Conversely, of course, a force can be supplied by the first drive 3 and, in this case, given a stationary or self-locking drive 5, the selector shaft 7 travels along a movement path that fulfills the condition that the distance between the first and second joints 43 and 45, when the linking joint 43 is held in place, must remain constant. Further, it should be noted that in the embodiment in FIG. 1, the gate 10 again performs the same function as explained above with reference to FIG. 2. That is, an additional part is provided to ensure that a course of movement occurs only on certain paths. Thanks to this path determination, it possible, at least in certain shift procedures, to energize only one of the first and second drives 3 or 5 and, as applicable, not to activate the other of the first and second drives until implementation of an already induced movement.

Figure 3:
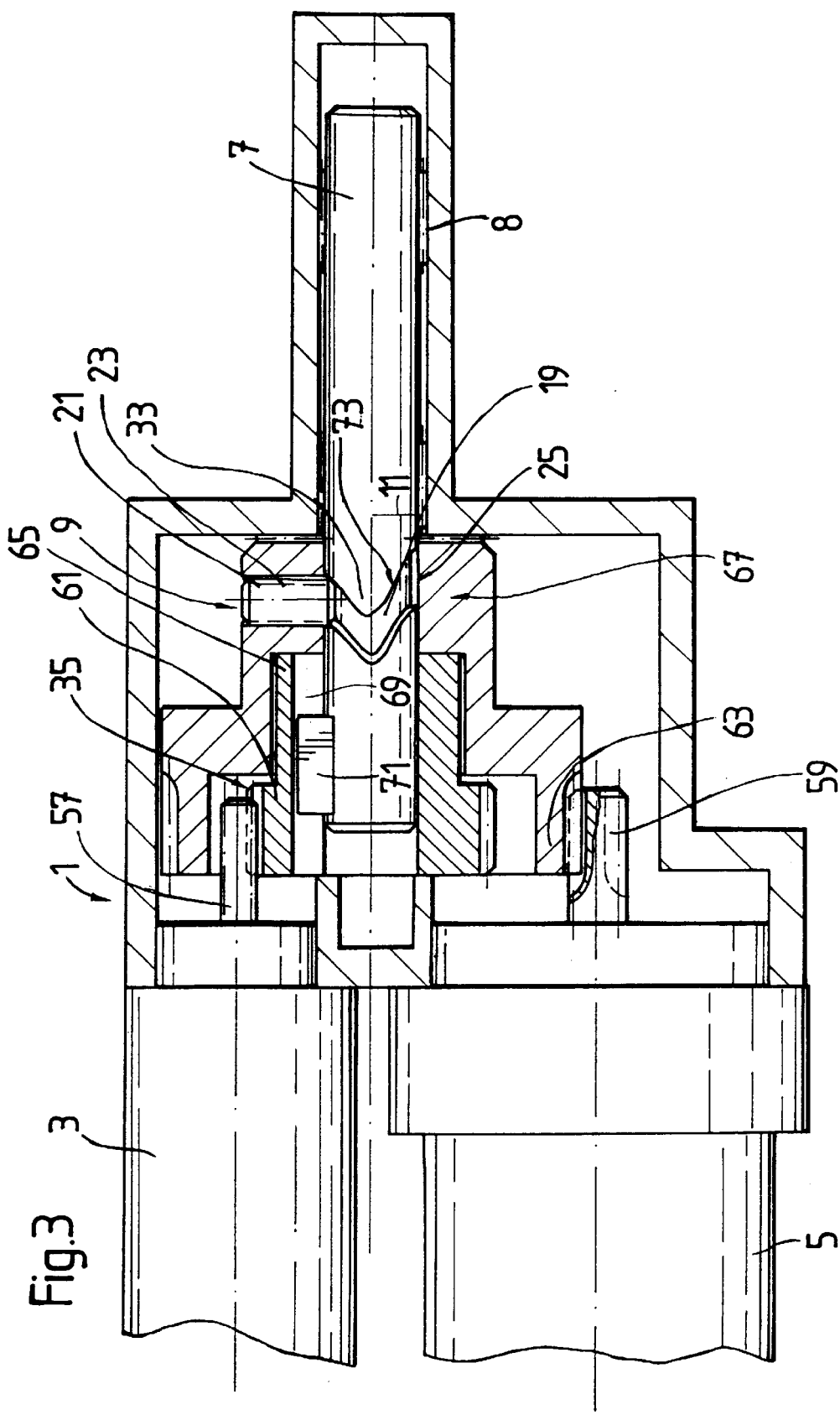
FIG. 3 shows an alternative embodiment of the actuating device of FIG. 2.

The actuating device 1" in FIG. 3 can be described as follows: The basic structure of the actuating device 1" corresponds to that described above in reference to FIG. 2. The actuating device 1" in FIG. 3 differs from the actuating device 1' in FIG. 2 in that the actuating device 1" includes the first and second drives 3, 5 arranged parallel to the selector shaft 7. The sleeves associated with the first and second drives 3, 5 are mounted on the selector shaft 7 and are coaxially internested with each other. Thus, this actuating mechanism has a very compact structure. The remaining structure corresponds to that already described with respect to FIG. 2. The function also corresponds to the function described in reference to FIG. 2, and thus need not be described in greater detail here.

In the case of a different transmission design, the gate is rotated 90 degrees with respect to the selector shaft 7 such that shift path selection corresponds to an axial movement of the selector shaft 7 and gear engagement and disengagement is carried out by a rotational movement of the selector shaft 7.

As explained above, the primary objective of the present invention is to allow individual activation procedures to be performed as quickly as possible. FIGS. 1–3 show embodiments for providing a guide which allows a gear change to be accomplished by continual activation of one of the drive, thereby reducing the time required for acceleration and deceleration of the drives required in the prior art devices. Another technique for minimizing the time required to change gears is to make the operating force produced by a drive as great as possible. Below, in reference to FIGS. 4 through 10, embodiments of actuating mechanisms according to the present invention are described that can be used especially advantageously in the inventive actuating devices 1, 1', 1" shown in FIGS. 1–3. For example, in actuating device 1 shown in FIG. 1, the second drive 5, the segment gear 47 and the link rod 41 (which here constitutes an output element) which produce an operating force may be replaced by an embodiment of an actuating mechanism as shown in one of the FIGS. 4–6, and 8–10. However, it should also be noted that the actuating mechanisms described below may also replace the first drive 3 in FIG. 1 or the first and second drives 3 and 5 of FIGS. 2 and 3. The drive elements shown in FIGS. 4 through 10 must be arranged so that they produce a rotational output force. For example, the drives may be connected to a worm gear to produce this rotational output force.

Figure 4:
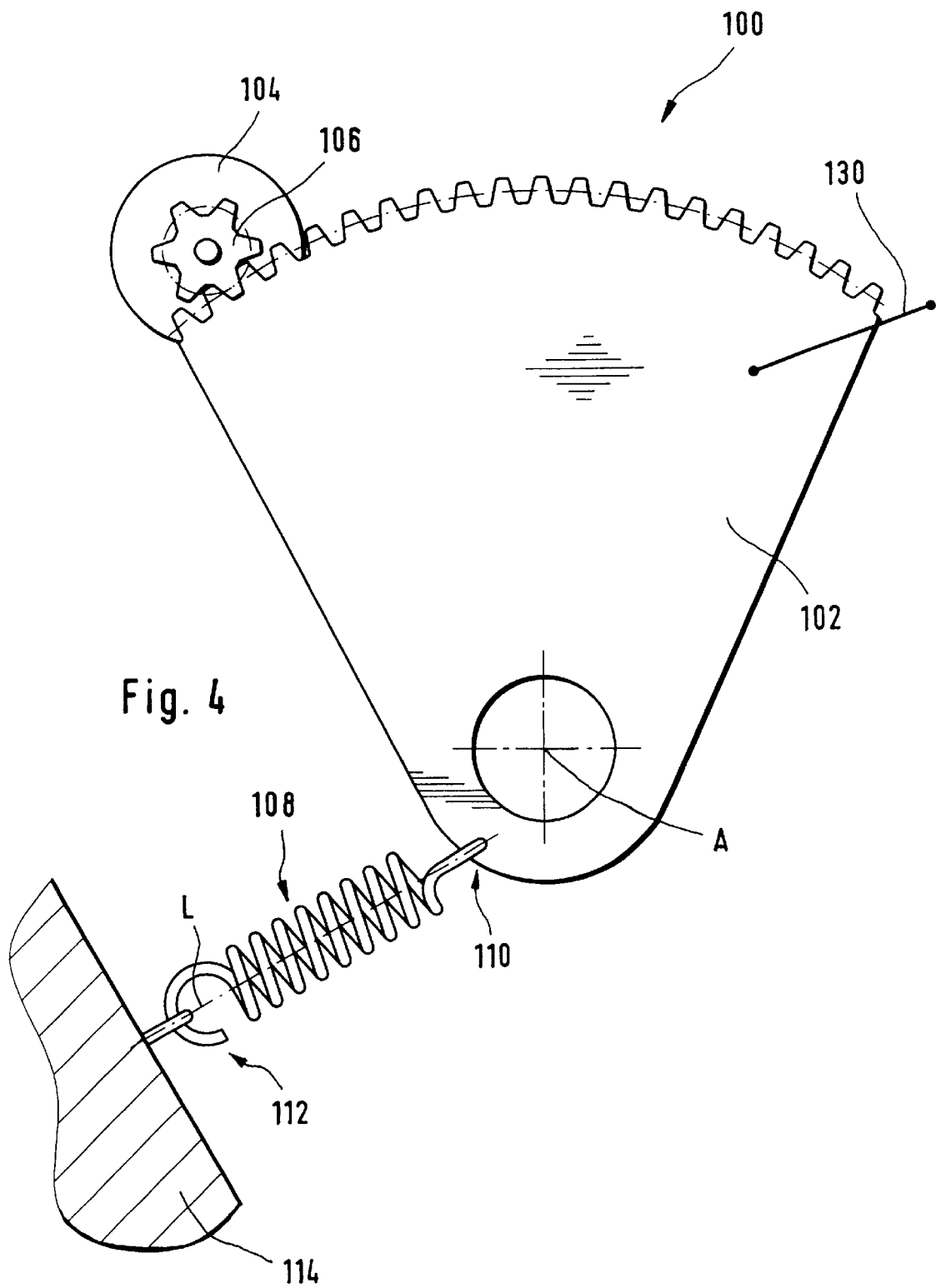
FIG. 4 is a schematic diagram of an actuating element according to an embodiment of the invention for use with one of the actuating devices of FIGS. 1–3 in a preparatory state in which a supporting force production spring is prestressed.

The basic function of an actuating mechanism according to the invention for producing an operating force is described below in reference to FIGS. 4 through 6. In FIG. 4, an actuating mechanism 100 is positioned in a preparatory state. A driving element 102, embodied as a segment gear, has been moved into the illustrated state by an actuating mechanism drive 104 which acts on the segment gear 102 via a gearwheel 106 or a worm gear or another transmission mechanism. The actuating mechanism drive 104 comprises, for example, an electric motor and moves the driving element 102 about a rotational axis A. A supporting spring force production unit 108, referred to below as the supporting spring 108, rests eccentrically on the driving element 102 with respect to the rotational axis A. A first end area 110 of the supporting spring 108 is connected to the drive element 102 and a second end area 112 of the supporting spring 108 is connected to an abutment element 114. In the preparatory state shown in FIG. 4, the supporting spring 108 is in a prestressed state. FIG. 4 also schematically shows an output part 130 to be operated connected to the driving element 102. The output part 130 may comprise any of the elements which are moved by the first and second drives 3, 5 in FIGS. 1–3 such, for example, as the link rod 41 or the gearwheel 31 shown in FIG. 1.

Figure 5:
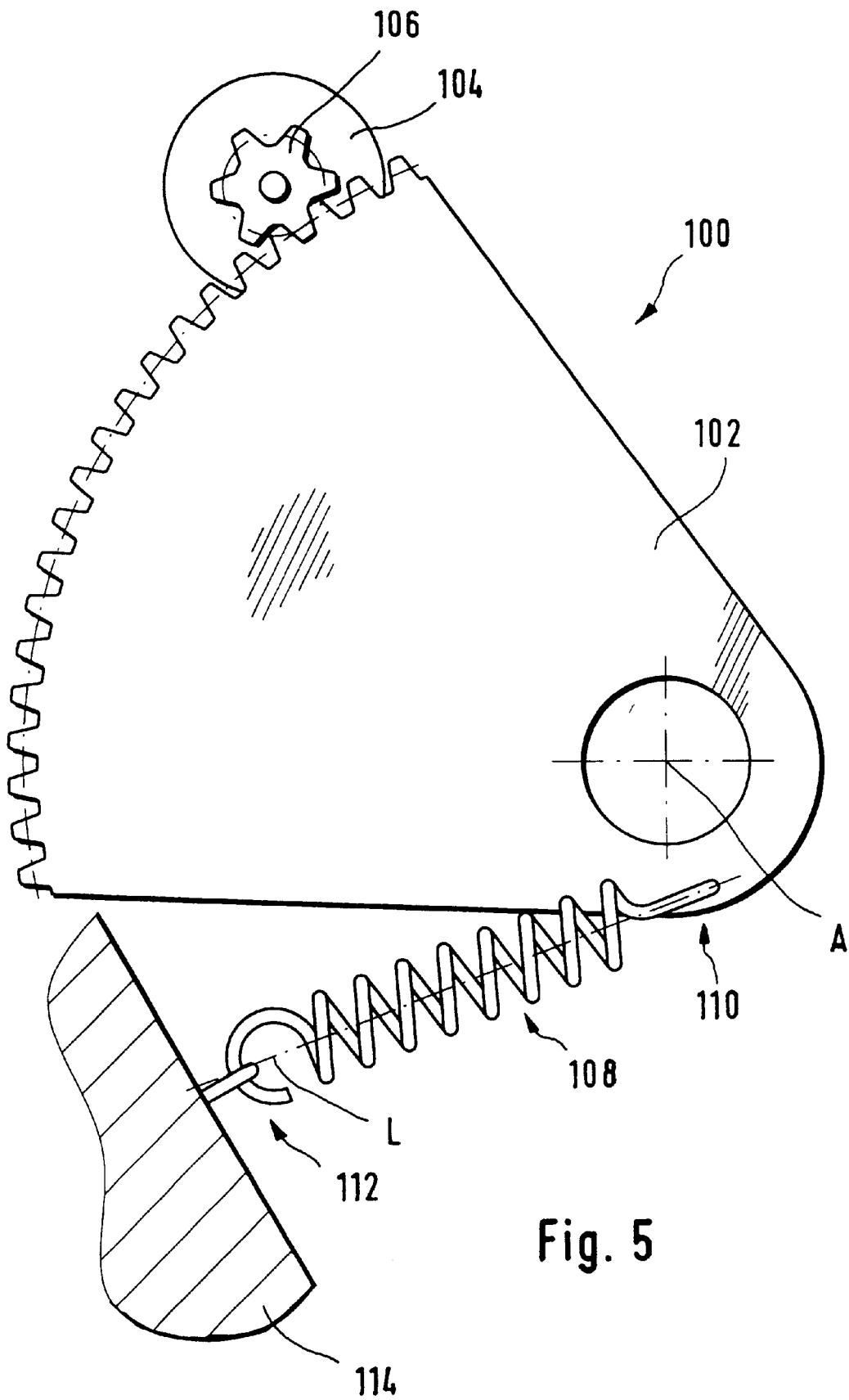
FIG. 5 shows the actuating element of FIG. 4 in a state in which the supporting force production spring is now relaxed.

If the output element 130 connected to the driving element 102 is to be moved, a suitable control is used to activate the actuating mechanism drive 104 to pivot the driving element 102 about the rotational axis A, starting from the preparatory state shown in FIG. 4, to the second operating state shown in FIG. 5. In this second operating state, the supporting spring 108 is substantially relieved. In other words, the supporting spring 108 expands along its longitudinal axis L in response to the movement from the preparatory state to the second operating state. During the operating process, the supporting spring 108 provides a support force to the actuating mechanism which supplements the force exerted by the actuating mechanism 104. A clearly greater output force of the actuating mechanism is produced. If applicable, the actuating mechanism 104 may be designed smaller in dimension based on the supplemental force provided by the supporting spring 108.

Figure 6:
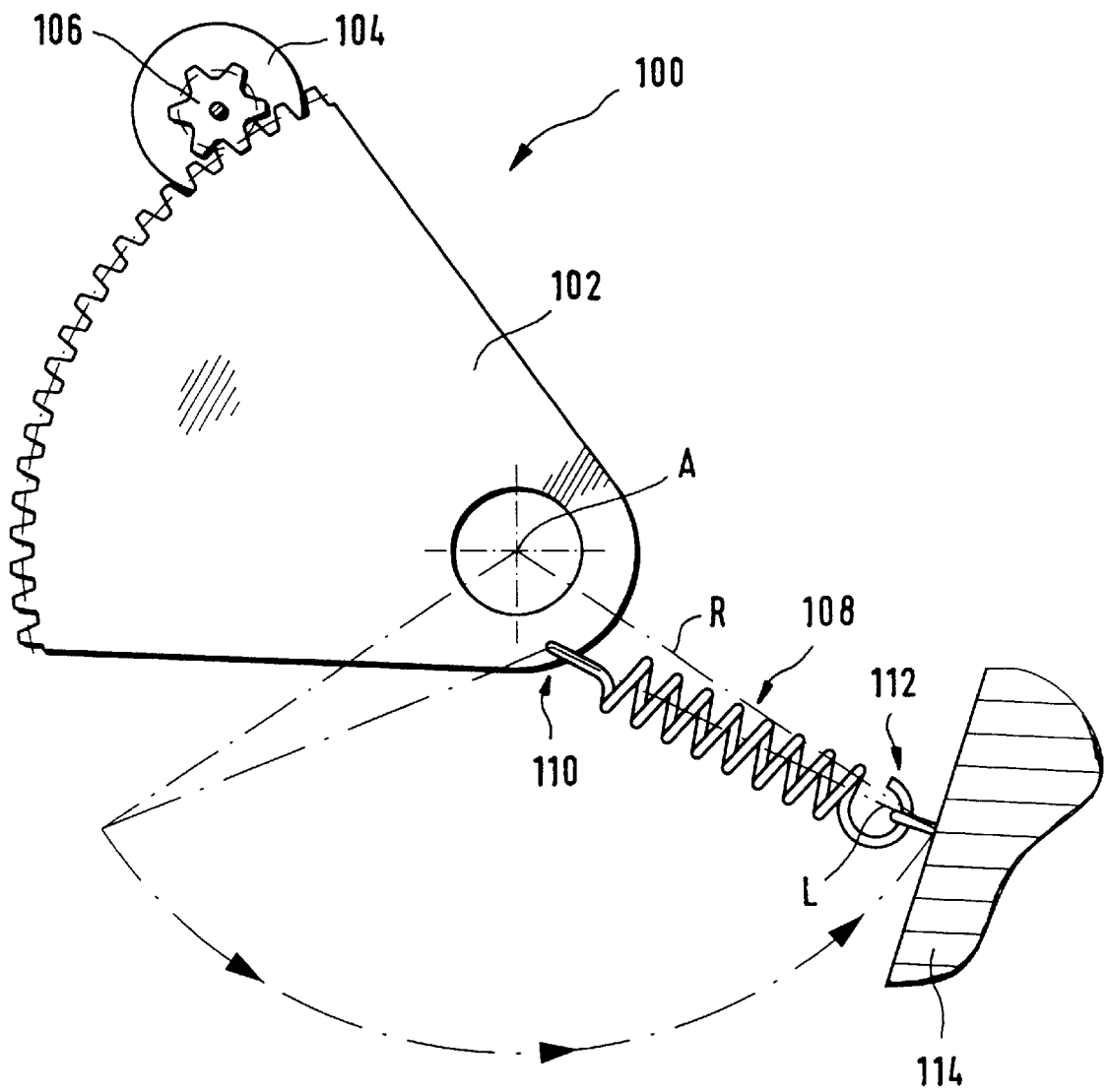
FIG. 6 shows a second preparatory state of the actuating element of FIG. 4 in which the actuating element, which now has a re-stressed supporting force production spring, is prepared for operation in the opposite direction.
Figure 7:
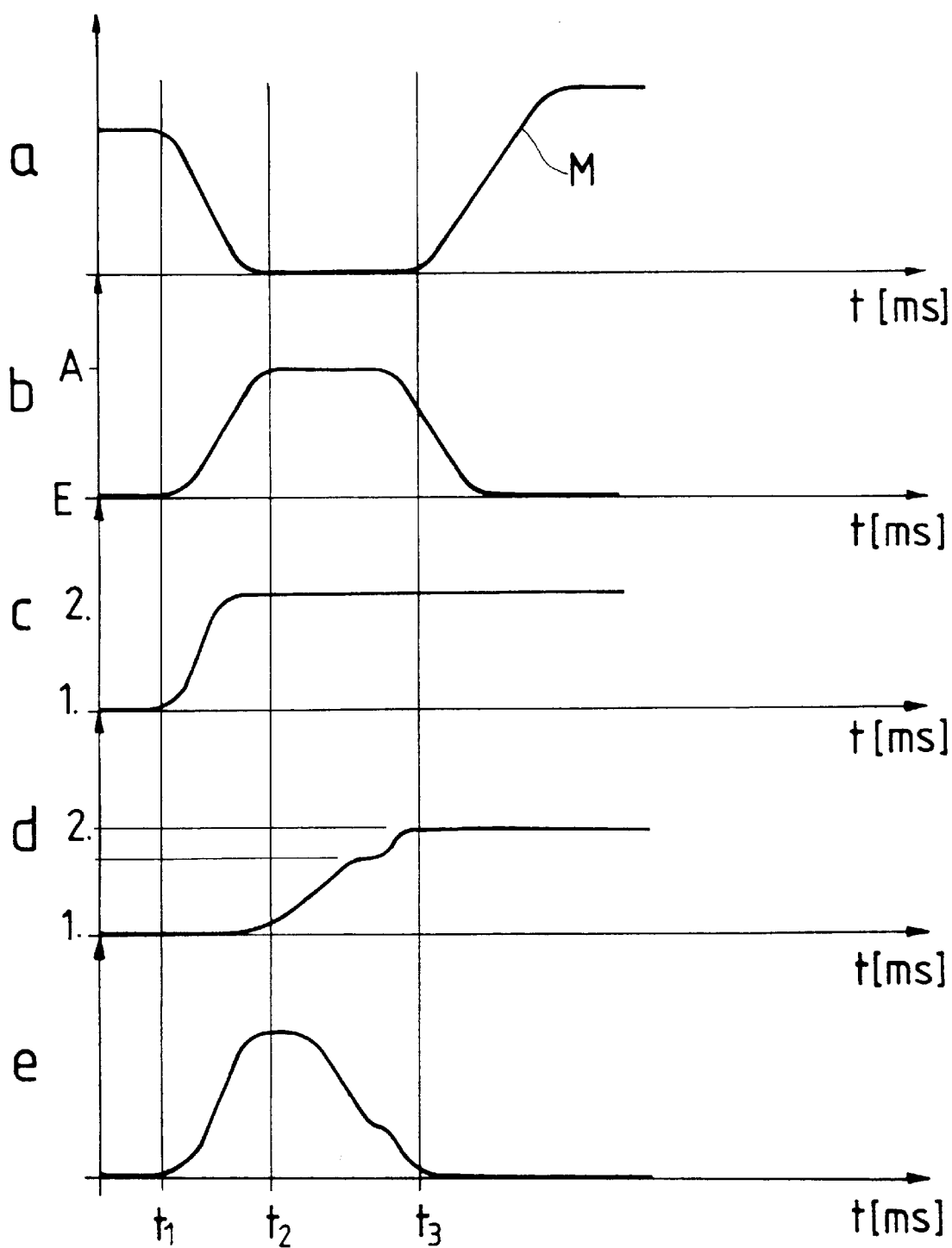

To benefit from the supplemental force of the supporting spring 108 during operation in the opposite direction when the drive element 102 is moved back into the preparatory state shown in FIG. 4, the abutment element 114 is moved into the position shown in FIG. 6 before moving the drive element back to the initial position. As indicated by a line R in FIG. 6, the abutment element 114 can be moved about the rotational axis A of the drive element 102 to a position in which the supporting spring 108 is again stressed. This stress of the support spring 108 occurs because the supporting spring 108 is connected eccentrically with its first end area 110 on the drive element 102 relative to the rotational axis A. If the actuating mechanism 100 is then placed into motion again by activating the actuating mechanism drive 104, the supporting spring 108 once again supplements the force output of the actuating mechanism drive 104.

Of course, this principle is not limited to movement back and forth between the two states shown in FIGS. 4 and 5. The assumption of any intermediate position is also possible. Further, it is possible to bring the supporting spring 108 into any desired position between the two positions shown in FIGS. 5 and 6, so that, depending on the operating process to be carried out, a suitable supporting force may be produced by the supporting spring 108. In addition, it is possible, for example, upon failure of the actuating mechanism 104, to bring the supporting spring 108 into its prestressed state independently of the actuating mechanism 104 and to thus produce a force so great that the output element 130 is pressurized and moved as desired even without a supporting force output by the actuating mechanism drive 104.

As already mentioned above, the actuating mechanism 100 may advantageously be used in connection with an automatic gear-change in a transmission, in which, for example, a selector shaft (such as selector shaft 7 in FIGS. 1–3) is generally to be moved back and forth between two end positions for assuming desired shifting states. The chronological course of a gearshift procedure is described below with reference to FIGS. 7a–7e.

FIG. 7a depicts the time curve of an engine torque during a gearshift operation which is controlled downward during a shifting process to prevent the engine from speeding up upon disengagement of the clutch. The disengagement state of the clutch is illustrated in FIG. 7b. As shown in the drawings, the engine torque decreases as the clutch disengages. For example, let us assume that the driver of a vehicle indicates at timepoint $t_1$ what gearshift procedure is to be implemented. This may be detected, for example, by the movement of a shifting lever or the like. Roughly at the time when the driver's wish to shift gears is detected, i.e., at timepoint ti, the engine torque M is controlled downward. Simultaneously, the clutch begins to be operated so that it is brought from a completely engaged state E into a disengaged state A, in which gear shifting is permitted.

If required by the particular transmission, a preselection element may also brought, at timepoint $t_1$, into an appropriate position via a suitable arrangement, so that the selector shaft is subsequently moved based on the position of the preselection element. The preselection element may, for example, comprise the sleeve 32 in FIG. 1. The movement of the preselection element is shown in FIG. 7c, which schematically indicates the position of a preselection element between first and second positions.

FIG. 7e illustrates the prestressed state of the supporting spring 108. This Figure shows that the supporting spring begins to move into its prestressed state, as shown in FIGS. 4–6, immediately after the desire to shift gears is detected at timepoint $t_1$. That is, a transition in the state of prestress occurs, for example, as in the movement between FIG. 5 to FIG. 6. The prestress process is implemented only after detection of the desire to shift gears for two basic reasons. The first reason is that it prevents the supporting spring 108 from remaining in a prestressed state during relatively long time periods during which no gearshift procedures are to be implemented. Fatigue phenomena are avoided in the area of the spring 108. The second reason for prestressing the supporting spring 108 at timepoint $t_1$, is that it may be desirable to assume various prestress positions depending on the type of gearshift procedure to be carried out. The desired prestress position is not known until it is known what gearshift procedure is to be implemented. If all preparatory measures have been completed, then, beginning at timepoint $t_2$, for example, the actual gearshift procedure can be carried out. FIG. 7d shows the movement of the part to be operated to effect the gearshift, e.g., the selector shaft. The part to be operated is brought from position 1 into position 2. As indicated in FIG. 7d, a plateau occurs corresponding to the synchronization phase. Because this transition of the selector shaft (the part to be operated) from one position into another goes along with the movement of the drive element 102 in the actuating mechanism 100, the supporting spring 108 is also relaxed at the same time as the selector shaft is moved, as shown in FIG. 7e. It should be noted that the final state of relaxation does not necessary need to correspond to the initial state. This may depend, as discussed earlier, on what operating state the actuating mechanism 100 assumes before and after implementation of a gearshift procedure.

At approximately timepoint $t_3$, when the part to be operated (here, the selector shaft) reaches its end position, the engine output moment is again increased, and the clutch is brought back into its engaged state, whereby the various processes can be deliberately advanced or delayed in terms of time. After engagement of the clutch, the actuating mechanism is then ready to implement a new gearshift procedure.

Figure 8:
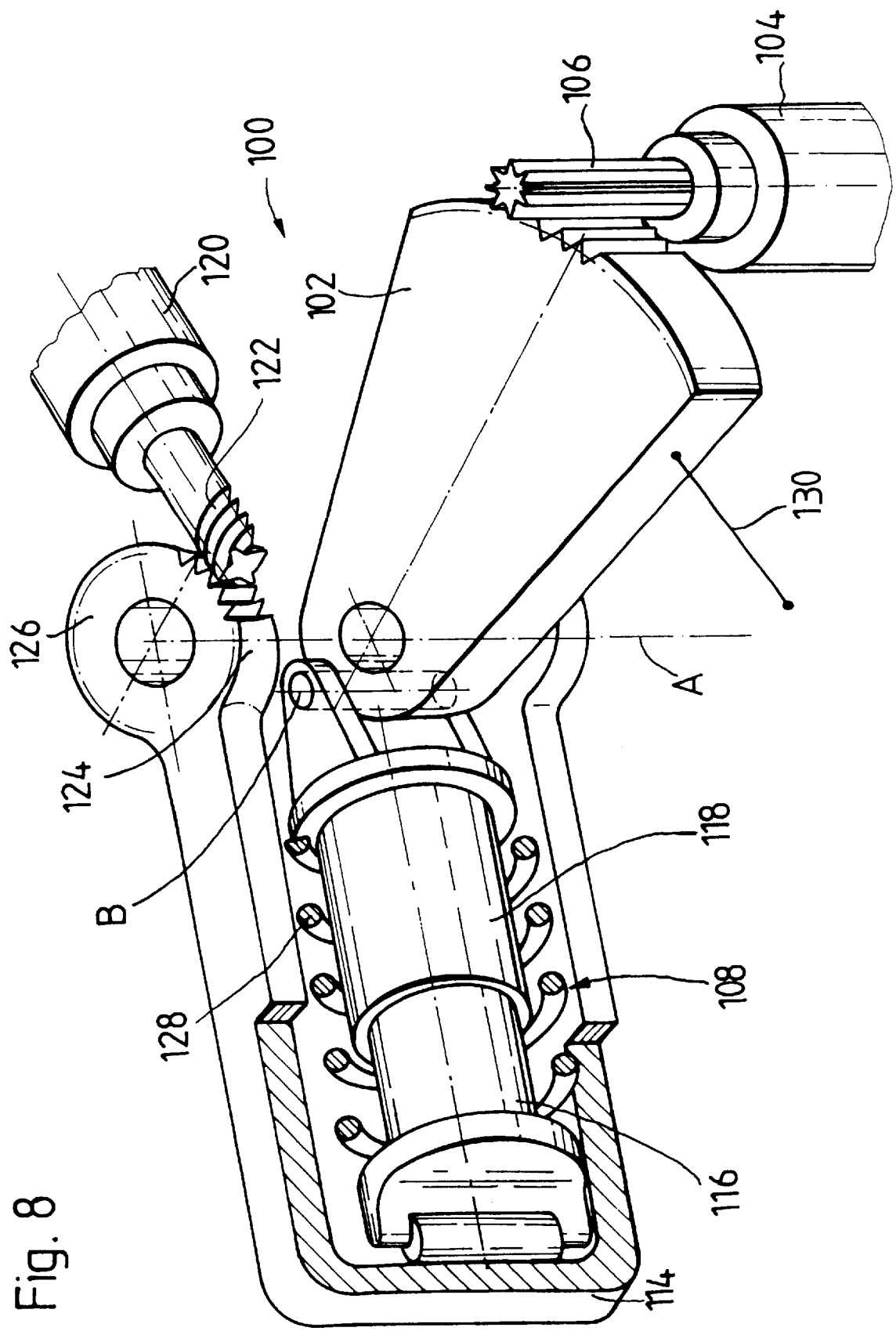
FIG. 8 shows a first embodiment of the actuating element according to the present invention.
Figure 9:
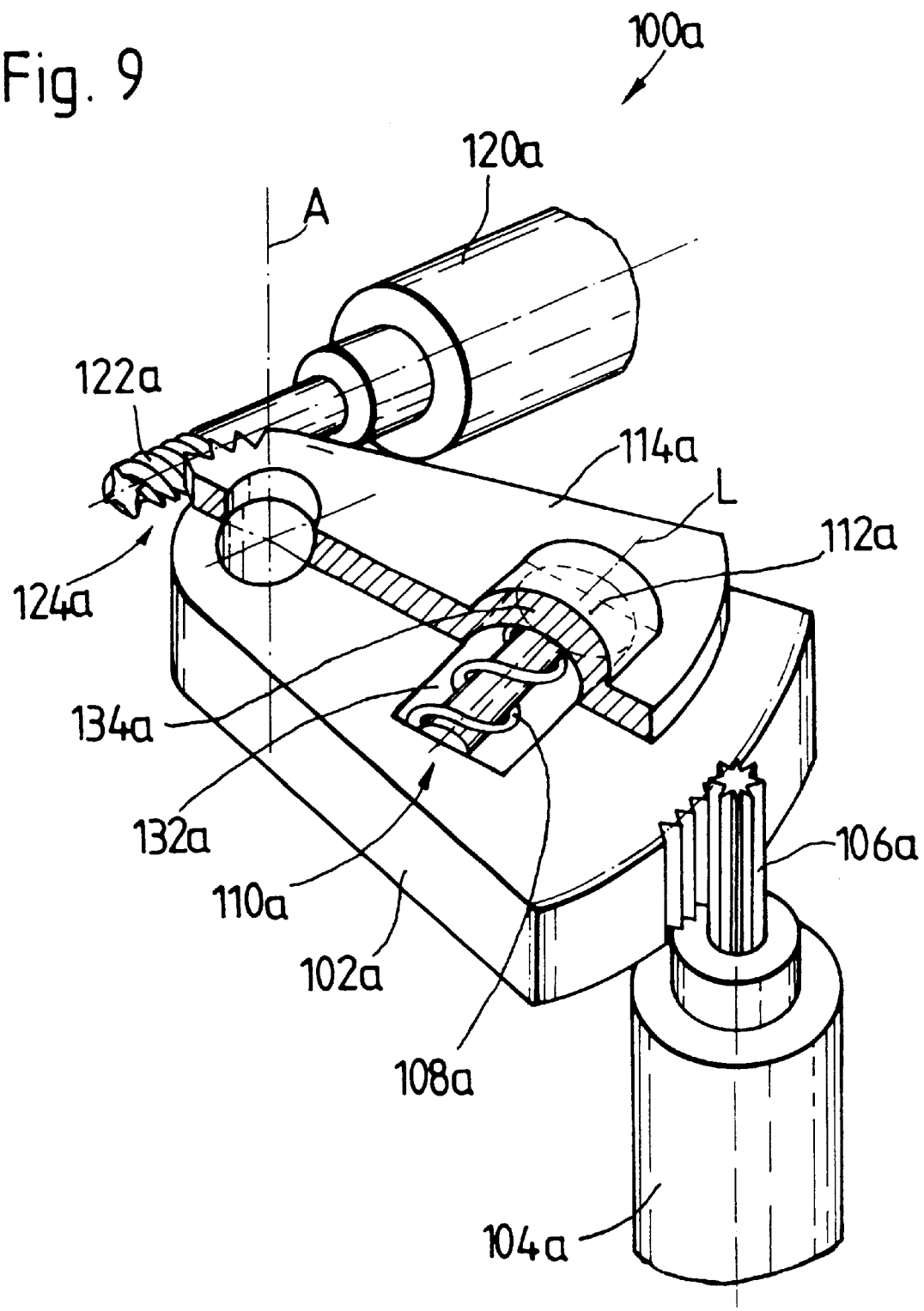
FIG. 9 shows a second embodiment of the actuating element according to the present invention.
Figure 10:
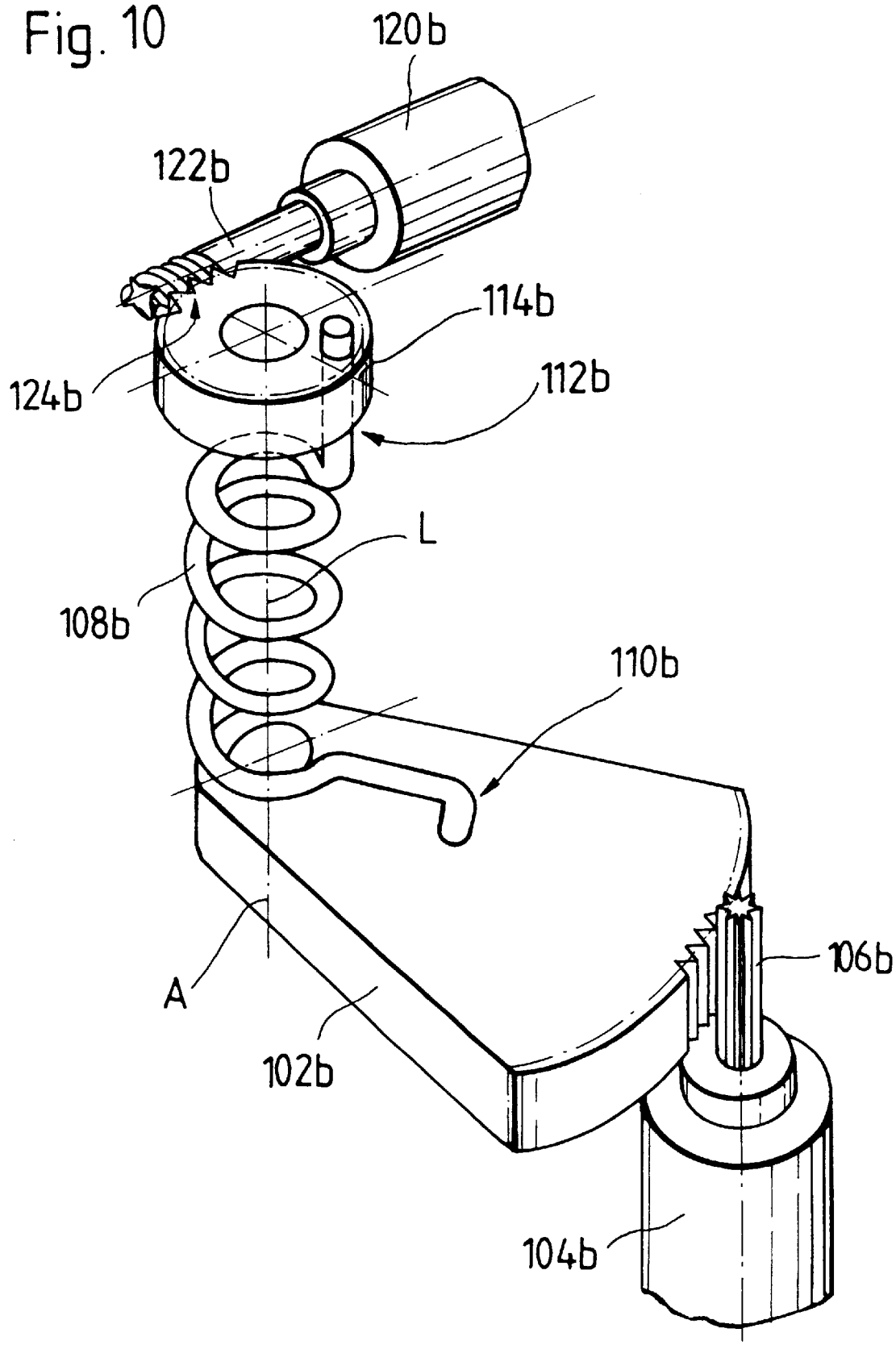
FIG. 10 shows a third embodiment of the actuating element according to the present invention.

FIGS. 8–10 show specific embodiments of an actuator with the above-described functional characteristics. An actuating mechanisms of FIGS. 8–10 corresponds substantially to the functional diagram in FIGS. 4–6 and elements which correspond to the elements shown in FIGS. 4–6 are referenced with the same reference character and a respective suffix a, b, or c An actuating mechanism 100a in FIG. 8 includes a drive element 102a mounted pivotably around a rotational axis A and driven by the actuating mechanism drive 104a (e.g., an electric motor) and gearwheel 106a in the form of a wormgear for effecting a pivoting movement.

In FIG. 8, the supporting spring 108a comprises two telescoping elements 116a, 118a. The element 118a on the drive element 102a acts pivotably around an axis B, which is substantially parallel to, but offset from, the rotational axis A. The element 116a rests on a U-shaped abutment element 114a. The U-shaped abutment element 114, as indicated with respect to FIGS. 4–6, is also mounted pivotably around the axis A. Further, a prestress drive 120a such, for example, as an electric motor or the like is operatively connected to the abutment element for changing a position of the abutment element 114a. To effect a change in position of the abutment 114a, the prestress drive 120a includes a worm gear 112a which intermeshes with a toothing 124a on a bearing eye 126a of the abutment element 114a. Instead of a worm gear 112a, a pinion or the like may also be used to mesh with the toothing 124a. By energizing the prestress drive 120a, the pivot position of the abutment element 114a around the rotational axis A is changed. The change in position of the abutment element 114a causes a change in the prestress state of the supporting spring 108a while the driving element 102a remains in the same position. The support spring comprises a helical compression spring 128 for providing the axial force spring and the telescoping elements 116, 118. Upon implementation of a process for prestressing the supporting spring 108a, as FIGS. 4–6 show, the supporting spring 108a is past a dead point, at which the support area of the spring 108a on the abutment element 1 14a, the pivot axis B and the pivot axis A lie in one line. As soon as the supporting spring 108a is pivoted beyond the dead point position, the supporting spring 108a provides a supporting force in an operating direction opposite to the previous operating direction.

It should also be noted that in FIG. 8, only the essential components are shown. It is understood that the actuator 100a may be arranged in an actuating mechanism housing (not shown) that carries an axial component for pivot-mounting the abutment element 114a and the drive element 102a, for example, and also provides a guide for the output element 130. Further, the actuating mechanism drive 104a as well as the prestress drive 120a may also be mounted on the housing.

FIG. 9 shows an alternative embodiment of an actuating mechanism 100b according to the invention. Components that correspond in structure and function to components described above are identified by the same reference numbers with an "b" added.

The actuating mechanism 100b in FIG. 9 comprises a drive element 102b that is movable in a known manner by an actuating mechanism drive 104b for a pivoting movement around a pivot axis A. An opening or depression 132b is arranged in the drive element 102b which receives the supporting spring 108b so that the supporting spring 108b lies approximately tangentially to the rotational axis A. End areas 110b or 112b of the supporting spring 108b rests on end areas of the depression 132b that are located, respectively, in the circumferential direction. An abutment element 114b comprises a substantially disk-like form and is pivotable by a prestress drive 120b about rotational axis A and preferably rests on the drive element 102b. The abutment element 114b has a complementary depression 134b associated with the depression 132b. In a relaxed state, the supporting spring 108b rests with its end areas 110b and 112b on the end areas of the depression 134b, which are also located in the circumferential direction. It should be pointed out that in FIG. 9, only half of the abutment element 114b is shown such that the position of the supporting spring 108b is visible. The abutment element 114b covers the supporting spring 108b such that the supporting spring 108b is held completely in the depression 134b.

If, starting from the state shown in FIG. 9, the abutment element 114b is pivoted by the prestress drive 120b, then the depression 134b moves relative to the depression 132b. As a result of the relative movement of the depressions 132b and 134b, the supporting spring 108b is compressed between one of the end areas of the depression 132b and an opposite end area of the depression 134b. The functional principle of this arrangement corresponds to that of a torsional vibration damper, as provided, for example, in the area of an automotive clutch disk. If the actuating mechanism drive 104b is then energized, the supporting spring 108b expands ftoward its relaxed state because the abutment element I 14b is held in a substantially fixed manner during such an implementation of an operating process. Thus, an operating characteristic can be obtained as described above with respect to FIGS. 4 through 8. A switch from one operating direction to another can be made during production of a supporting force, by pivoting the abutment element 114b in the appropriate direction relative to the drive element 102b by means of the prestress drive 120b.

In this embodiment, it can be advantageous to provide a cover disk element (an abutment element 114b) of this type on both sides of the drive element 102b and to arrange the depression 132b continuously in the drive element 102b so that a symmetrical pressurization of the supporting spring 108b in the axial direction occurs on the two cover disk or abutment elements (which must be connected to each other in rotation-proof fashion) on one side of the supporting spring 108b and on the drive elements 102b on the other side of the supporting spring 108b, as happens, for example, in known torsional vibration dampers.

It should be noted that in the embodiments described above as well as in those described below, the prestress drive 120 may be operated simultaneously with the actuating mechanism drive 104 so that the abutment element 114 tracks or follows the movement of the driving element 102.

In addition, a mechanical changeover mechanism (not shown) may be provided that can direct the force output of an actuator drive in the direction of the drive element one time and in the direction of the abutment element the next time. In this device, actuating drive can be operatively connected with the abutment element for changing the prestress state in a preparatory phase and can be operatively connected to the driving element in an operating phase for effecting the operating process. Therefore, a single drive is sufficient to implement both of the above functions. A shifting arrangement may be operated, for example, electromagnetically and with low power as needed to activate the particular force output paths. However, care must then be taken to ensure that the self-locking of the driving element that would otherwise be produced by the actuating mechanism drive is still produced or achieved in another manner, so that the prestress state brought about by the actuating mechanism drive does not lead to unintentional operation or movement of the driving element.

A further embodiment of the actuating mechanism according to the invention is shown in FIG. 10. Components that correspond in structure and function to components described previously are identified by the same reference numbers with a "c" added.

In the embodiment shown in FIG. 10, a supporting spring 108c is embodied as a torsional spring. That is, for the purpose of producing the prestress state, the spring 108c, shown as a helical spring, is pressurized under torsion relative to its longitudinal axis L. Instead of expanding or compressing the spring, one end of the supporting spring 108c is rotated relative the other about the longitudinal axis L of the spring to produce the prestress state. The supporting spring 108c is arranged such that the longitudinal axis L approximately coincides with the rotational axis A. A first end area 110c of the supporting spring 108c is connected on the drive element 102c. A second end area 112c of the supporting spring 108c is connected on an abutment element 114c which is embodied here in a disk-like manner and is also rotatable around the rotational axis A by the prestress drive 120c. By energizing the prestress drive 120c and inducing rotation of the abutment element 114c when the drive element 102c is stationary, the supporting spring 108c is twisted thereby changing its prestress state. In this way, a change in the prestress state can easily be accomplished, wherein the masses moved to produce this prestress state are advantageously very small, so that the process can be undertaken very quickly. It should be noted that a wide variety of torsional elements such, for example, as a torsional rod or the like may used instead of a helical spring. Otherwise, this embodiment also permits the above-described implementation of an operating process or the preparation for such a process.

It should also be pointed out that embodiments that use axial force spring arrangements also permit the use of gas compression springs or solid block springs that consist, for example, of solid rubber blocks or the like. The use of springs that can be pressurized under tension is also possible, whereby suitable suspension devices must be provided at the two end regions.

FIGS. 4–10 and the above descriptions thereof describe actuating elements in which the motorized actuating element drive is supported, during the production of an operating force, by spring arrangements. Because the spring arrangements that produce the supporting force are associated with separate drives for stressing the supporting springs regardless of whether the actuating element drive is energized or not, such actuating elements may also be used in operational areas in which, for example, two operating directions are necessary. It is significant that energy can be stored at any time in the spring elements by prestressing the spring elements which are, in this case, the energy storage devices. Further embodiments of actuating elements are described below which utilize the principle of charging an energy storage device independently of the movement or operating state of an output element of the actuating element.

Figure 11:
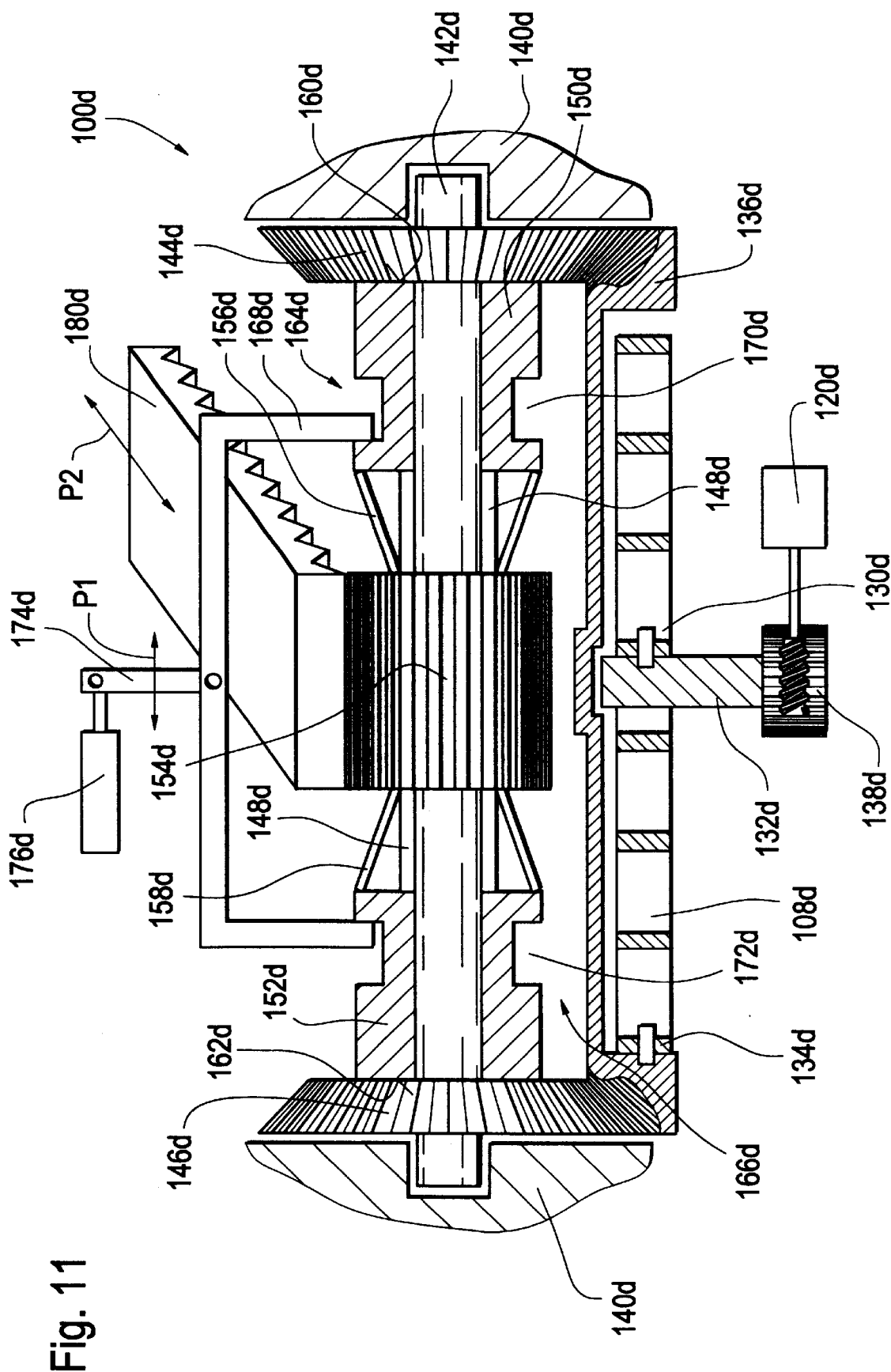
FIG. 11 shows a portion of an alternative embodiment of an actuating element according to the present invention.

In FIG. 11, an actuating element 100d comprises an energy storage device in the form of a spiral spring 108d having multiple windings. An inner winding area 131d of the spiral spring 108d is secured on a rotatable shaft 132d and an outer winding end area 134d is secured in on a driving gear 136d having the form of a bevel gear. The shaft 132d engages a toothed gear 138d which may be rotated, for example, via a worm drive, by a drive 120d. The drive 120d comprises a charging drive because the spiral spring 108d is stressed or charged upon energization of the drive 120d and rotation of the shaft 132d while the bevel gear 136d is held fast.

A further shaft 142d is rotatably mounted in an actuating element support or housing 140d (shown schematically in the figure). Two transmitting gears 144d, 146d are positioned on the shaft 142d and are freely rotatable relative to the shaft but are held in an axially stationary manner thereon. The two transmitting gears 144d, 146d comprise bevel gears and are in a permanent meshed engagement with the driving bevel gear 136d. In the area located between the two transmitting gears 144d, 146d, the shaft 142d has a longitudinal groove 148d. Coupling elements 150d, 152d are arranged in this area on the shaft 142d which are associated with the two transmitting gears 144d, 146d. The coupling elements 150d, 152d have complementary grooving to the longitudinal groove 148d and are thus held in a rotation-proof manner on the longitudinal groove 148d. The coupling elements 150d and 152d are axially movable relative to the shaft 142d. An output gear 154d also has a groove of this type and is mounted in rotation-proof and axially stationary fashion on the shaft 142d. Spring elements 156d, 158d such, for example, as cup springs rest on both sides of the output gear 154d and press the coupling elements 150d, 152d against the transmitting gears 144d, 146d. In this way, a friction-locking coupling is established between the coupling elements 150d, 152d and the transmitting gears 144d, 146d in adjacent surface regions 160d, 162d. Thus, the coupling element 150d and the associated spring 156d form a first coupling arrangement 164d and the coupling element 152d and the associated spring 158d form a second coupling arrangement 166d.

For the engagement and disengagement of these first and second coupling arrangements 164d and 166d, an operating element 168d, which in the depicted embodiment is designed in a fork-like manner, engages with its respective fork ends in circumferential grooves 170d, 172d of the coupling elements 150d, 152d. This fork-type operating element 168d is connected via a connecting element 174d to an operating drive 176d. Upon energization of the operating drive 176d (which can produce an output force, for example, by an electric motor or fluid operation or a piezo element), the operating element 168d moves in a direction of an arrow P1. The operating drive 176d may comprise a bimetallic drive or a form-memory alloy drive. The driving force may also be transmitted by a screw-and-nut system. Furthermore, the drive 120d may also be embodied as a pressure-medium drive, an electric motor drive or a piezo motor.

The functional principle of the actuating element 100d shown in FIG. 11 is described in what follows.

In the illustrated state, the two coupling arrangements 164d, 166d are in an engaged state (the two transmitting gears 144d, 146d are coupled to the shaft 142d) so that a blocking state exists. If the spiral spring 108d is in a prestressed state and the driving bevel gear 136d is thus prestressed for rotation around an axis preferably coaxial to the shaft 132d, the transmitting gear 144d would be driven in a different rotational direction than the transmitting gear 146d. However, because these two transmitting gears 144d, 146d are both connected in a rotation-proof manner to the same shaft 142d, rotation is prevented. The two coupling arrangements 164d, 166d thus form a blocking device that arrests the actuating element 100d in the operating position shown in FIG. 11. However, this operating position may be shifted via the operation of the operating drive 176d, so that a gear rack element 180d that is in a meshed engagement with the output gear 154d is moved back and forth in the direction of an arrow P2. Starting from the operating position shown in FIG. 11, if the spring 108d is stressed by energization of the charging drive 120d, and the operating element 168d is moved to the left by (for example) the operating drive 176d, then the coupling element 150d of the first coupling arrangement 164d will also be taken along to the left. The movement of coupling element 150d terminates the rotation-proof connection of the transmitting gear 144d to the shaft 142d. The shaft 142d is then driven by the driving bevel gear 136d via the rotation of the transmitting gear 146d. The output gear 154d mounted on the shaft 142d rotates as well and moves the gear rack 180d in a first direction along arrow P2. If the operating element 168d is returned to the operational state shown in FIG. 11, the shaft 142d is blocked from further rotation. The gradual return movement of the operating element 168d to the position shown in FIG. 11 is accompanied by a similarly gradual slowing of the movement of the driving gear 136d. Further movement of the operating element 168d to the right in FIG. 11 causes the coupling element 152d of the second coupling arrangement 166d to release the transmitting gear 146d, so that the shaft 142d is driven via the transmitting gear 144d in the opposite direction. The output gear 154d is also turned in the opposite direction and the gear rack 180d is moved back toward its starting position.

The actuating element 100d in FIG. 11 discloses that the energy supplied by the spring (energy storage drive) 108 may be directed to the output gear 154d via one of two energy transport paths. The first energy transport path is via the transmitting gear 144d and the first coupling arrangement 164d and the second energy transport path is via the transmitting gear 146d and the second coupling arrangement 166d. Each of these transport paths includes a coupling arrangement for selectively interrupting the flow of energy to the output gear. If an engaged state is established in both paths then the aforementioned self-blocking state occurs.

It should be noted that the energy storage device (spring 108d) may comprise any other desired form. Thus, instead of the spring 108d, a spring arrangement as shown in FIG. 10 or a spring arrangement as shown in FIG. 9 which is similar to spring arrangements used in torsional vibration dampers with helical compression springs extending in approximately the circumferential direction may also be used. Instead of a spring, a flywheel may also be used as the driving gear 136d which is placed into rotation by the charging drive 120d and permanently drives the transmitting gears 144d, 146d. The coupling arrangements 166d, 164d must then be embodied in such a way that they are disengaged in the normal state and can be brought, via the operating drive 176d, into an engaged state that connects one of the transmitting gears 144d, 146d to the shaft 142d. A blocking or an interruption of the energy flow then occurs when none of the coupling arrangements is in the engaged state.

In the embodiment in FIG. 11, the actuating element 100d produces an operating force without being supported by an additional drive as shown in FIGS. 4 through 11.

Figure 12:
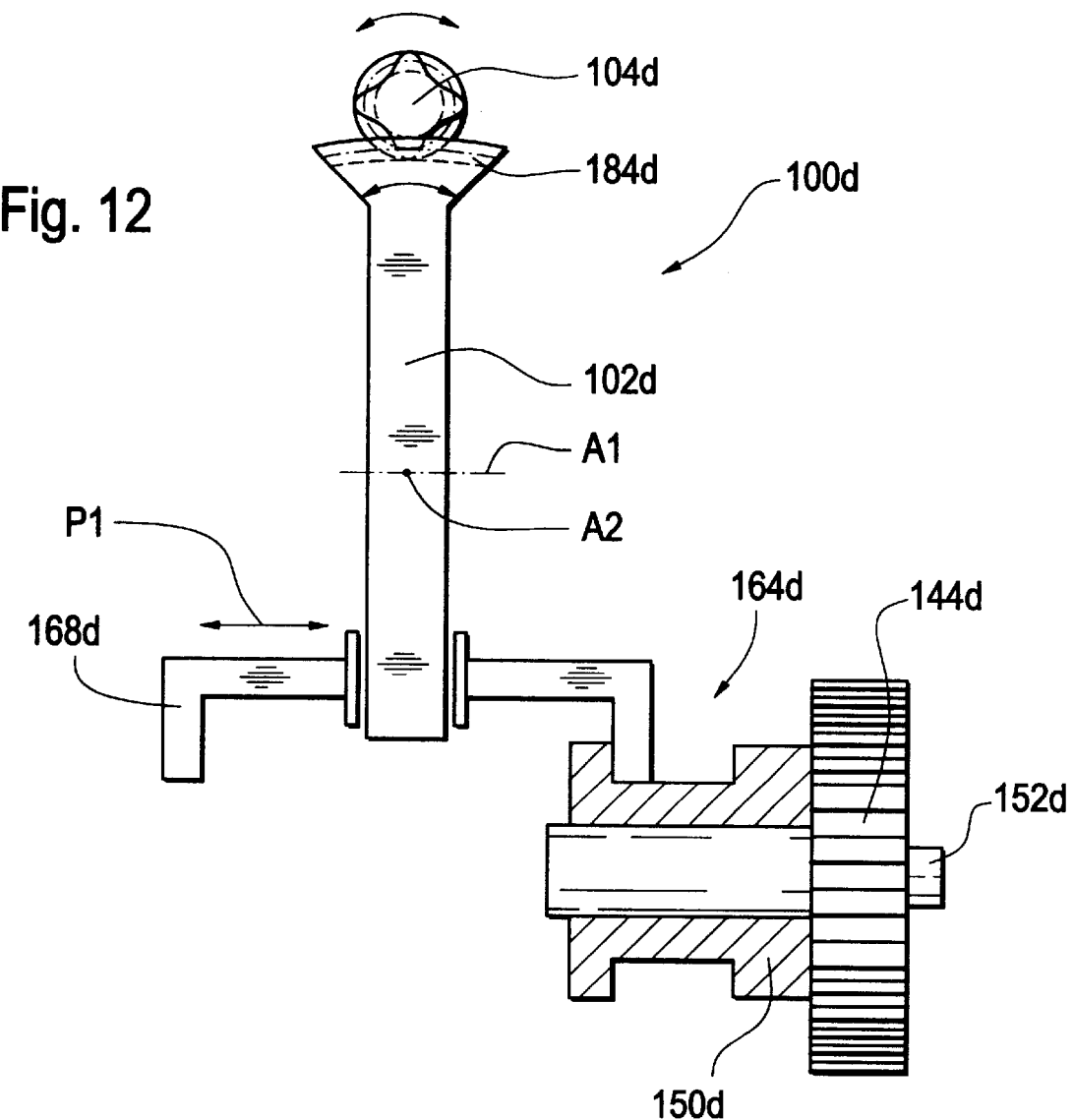
FIG. 12 shows the embodiment of the actuating element in FIG. 11 with a modified arrangement for production of the shifting force.

FIG. 12 shows an embodiment of the actuating element 100d shown in FIG. 11 but modified, especially in the area of operation of the coupling arrangements. To simplify the Figure, only the first coupling arrangement 164d is shown in FIG. 12. The actuating element 100d in FIG. 12 comprises the segment gear 102d, as shown already in FIGS. 4 through 10. This segment gear 102d is again driveable by a movement drive 104d for the purpose of a pivot movement around an axis A1, so as to move, for example, an output element (not shown) of the actuating element 100d connected to the segment gear 102d. The drive 104d is operatively connected to the segment gear 102d via a toothed area 184d on the segment gear 102d. When a screw-type tooth system is used between the drive 104d and the segment gear 102d, the energization of the drive 104d and the accompanying pivoting of the segment gear 102d about the axis A1 produces a transverse force causing the segment gear 102d to pivot about an axis A2 which is perpendicular to the axis A1. In the case of cardanic suspension of the segment gear 102d, the pivoting of the segment gear 102d around the axis A2 can serve to move the operating element 168d laterally along the direction of the arrow P1 to activate the first and second coupling arrangements 164d, 166d as described above with reference to FIG. 11. When there is a cardanic suspension the segment gear 102d executes a circular movement in the areas remote from the pivot axis A2. Therefore, it is necessary to embody the toothed area 184d of the segment toothed gear 102d with a circular configuration to maintain uniform driving contact between the segment gear 102d and the drive 104d. It should be noted that this embodiment of the movement drive 104d, which supplies a portion of the force transmitted to (and thus released by) the output element, simultaneously forms the operating drive for the operating element 168d. Thus, a very compact structure of the actuating element can be attained, because the number of drives is minimized.

Figure 13:
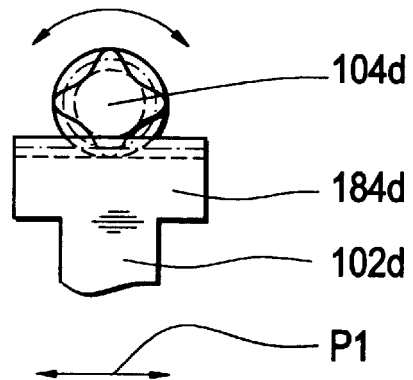
FIG. 13 shows a modification of the arrangement shown in FIG. 12.

In the embodiment of the segment gear 102d ' shown in FIG. 13 a movement suspension of the segment gear 102d ' is used instead of a cardanic suspension. The segment gear 102d ' moves along its pivot axis A1 in the direction of the arrow P1. Therefore, the transverse force produced by the interaction between the drive 104d and the tooth system 184d ' (here embodied in straight-line configuration) of the segment gear 102d is used for a linear displacement movement for moving the operating element 168d in the direction of arrow P1, as described above.

Figure 14:
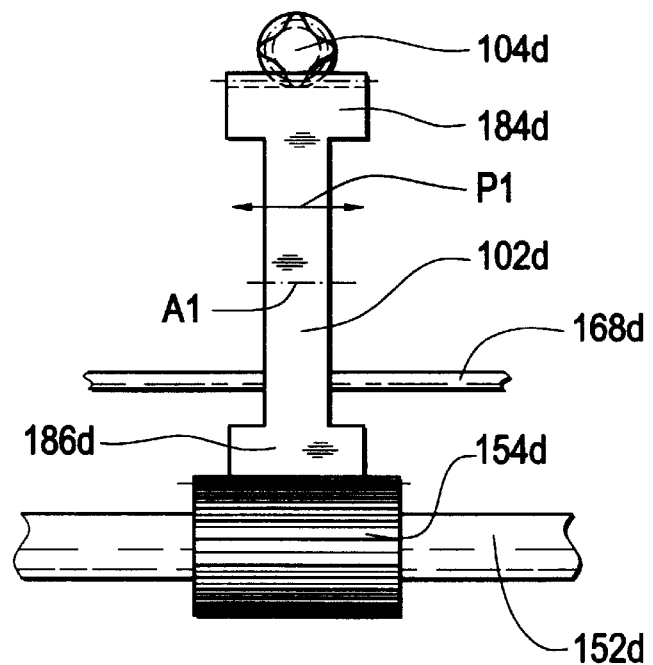
FIG. 14 shows the energy transport connection of the embodiment in FIG. 11 to a segment gear.
Figure 15:
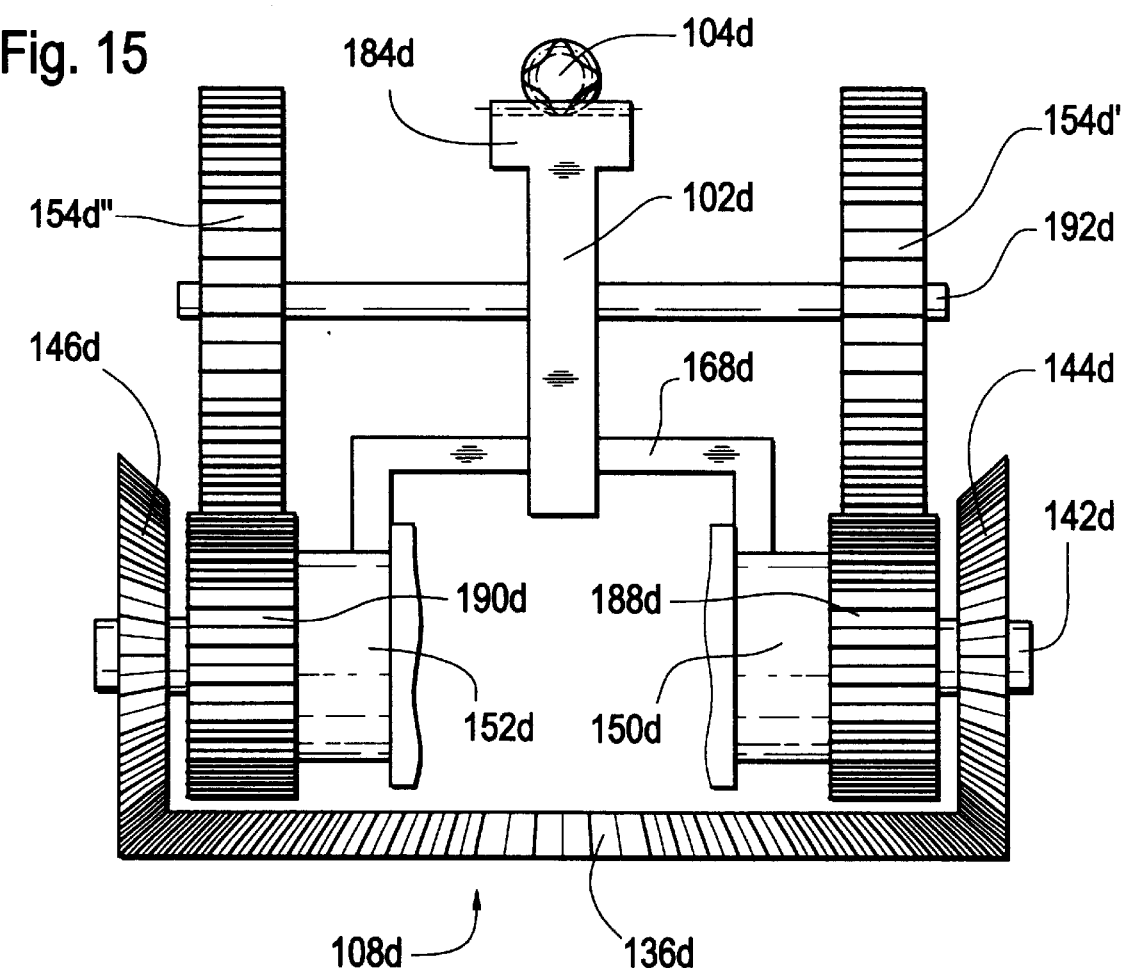
FIG. 15 shows a modification of the embodiment shown in FIG. 14.

Using a segment gear 102d with an actuating element like that in FIG. 11, FIGS. 14 and 15 show different embodiments for directing the supporting force produced by the energy storage device to the segment gear 102d.

In FIG. 14, an end area of the segment gear 102d remote from the drive 104d comprises a further toothing configuration 186d which intermeshes with the output gear 154d. If, as described above in reference to FIG. 11, the shaft 152d is placed into rotation by one of the transmitting gears 144d, 146d, the output gear 154d is also rotated and this rotational movement is transmitted to the segment gear 102d. Thus, in addition to the driving force produced by the drive 104d, a driving force produced by the conversion of energy stored in the energy storage device is transmitted to the segment gear 102d, and the latter is pivoted around its pivot axis A1. Of course, in an embodiment of the segment gear 102d like that shown in FIG. 12, the toothing configuration 186d is also embodied with a curved circumferential contour.

In the embodiment of the actuating element 100d which is partially shown in FIG. 15, each of the coupling elements 150d, 152d has a toothed area 188d, 190d which intermeshes with respective output gears 154d ', 154d ". The two output gears 154d ', 154d " are held in rotation-proof fashion on a further shaft 192d which also carries the segment gear 102d. If one of the coupling elements 150d, 152d is moved in the disengagement direction, the other coupling element 150d, 152d is driven to rotate and thus drives its associated output gear(not shown). The other coupling element 150d, 152d also drives the segment gear 102d via the shaft 192d in a supportive manner relative to the drive 104d.

Figures 16, 17:
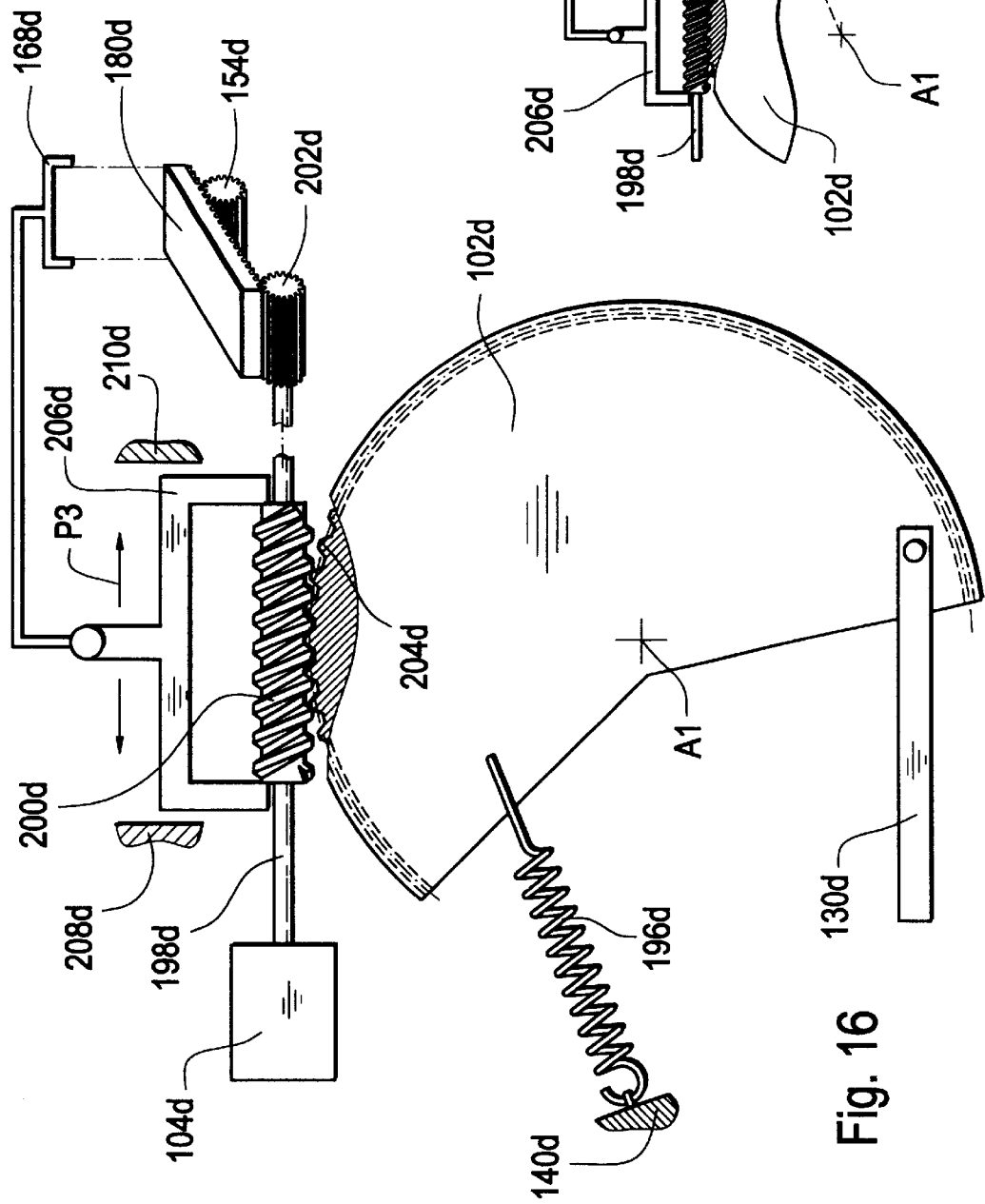
FIG. 16 shows another portion of the actuating element according to the invention shown in FIG. 11.
FIG. 17 shows another embodiment of the portion of the actuating element shown in FIG. 16.

In addition to the force transmitted to the segment gear 102d via the drive 104d and the energy storage device 108d, a compensation force production device such, for example, as a compensation spring may also be used to supply a further supporting force to the segment gear 102d. The additional force may be especially usefull when the actuating element 100d is used to operate a clutch. FIG. 16 shows such an arrangement including the segment gear 102d which is pivotable about the axis A1 for moving an output element 130d. A compensation spring 196d acts upon the segment gear 102d with one end and rests at the other end area on a stationary section such, for example, as a housing 140d. The compensation spring 196d may be designed such that the counterforce produced by a diaphragm spring or other power storage device of a clutch almost completely compensated for via the force of the compensation spring 196d and the radial distance of its connection to the segment gear 102d from the area of the pivot axis A1.

In the device of FIG. 16, the drive 104d rotates a shaft 198d having a worm gear 200d which is rotatably fixed and axially movable on the shaft 198d and a gear 202d which intermeshes with the gear rack 180d. The worm gear 200d is in meshed engagement with a tooth system 204d of the segment gear 102d. When the drive 104d is energized, the segment gear 102d initially remains stationary and the worm gear 200d is axially moved on the shaft 198d. The worm gear 200d carries a disengagement element 206d along the direction of an arrow P3. The disengagement element 206d comprises a substantially fork-like shape and the worm gear 200d is held substantially play-free between the fork ends of the disengagement element 206d. The disengagement element 206d is also connected to the operating element 168d for transmitting force to the operating element 168d which controls the first and second coupling arrangements 164d, 166d as shown in FIG. 11. This transmission of force can be directly mechanical or may occur via an input and output cylinder system or in some other manner such, for example, as via a Bowden cable. The linear movement of the worm gear 200d and thus of the disengagement element 206d is supported from the beginning of the displacement motion by the power storage device 108d. When the disengagement element 206d moves, one of the couplings is disengaged via the operating element 168d and the blocking state is ended. The drive 104d is thus supported via the gear rack 180d by the arrangement shown in FIG. 11.

The linear movement continues until one of the stops 208d, 210d is reached by the worm gear 200d and/or the disengagement element 206d. In this state, the force introduced from the drive 104d and the force introduced via the gear rack 180d are converted directly into a pivot movement of the segment gear 102d and thus into a displacement movement of the output element 130d.

An alternative method of conveying the supporting force produced by the energy storage device 108d is shown in FIG. 17. Here, the shaft 142d shown in FIG. 11 which is rotatable by the energy storage device 108d is arranged on an extension of the shaft 198d and connected thereto in a rotation-proof fashion or embodied as a single piece therewith. Thus, the intermediate connection of the gear rack shown in FIG. 16 is not required. It is also possible to directly use the shaft 142d as the bearing and the driving shaft for the segment gear 102d as indicated in FIG. 17 by the broken line L. In this case, the shaft 142d would be skewed and orthogonal relative to the shaft 198d. Further, the output gear 154d may be in meshed engagement with the tooth system 204 of the segment gear 102d.

It should also be noted that in the embodiment in FIG. 16, the transmission of force between the output gear 154d and the shaft 198d need not necessarily occur via the gear rack 180d. It is also conceivable for the connection to be undertaken via a toothed belt, or some other belt, of a gear driven by the shaft 142d.

Figure 18:
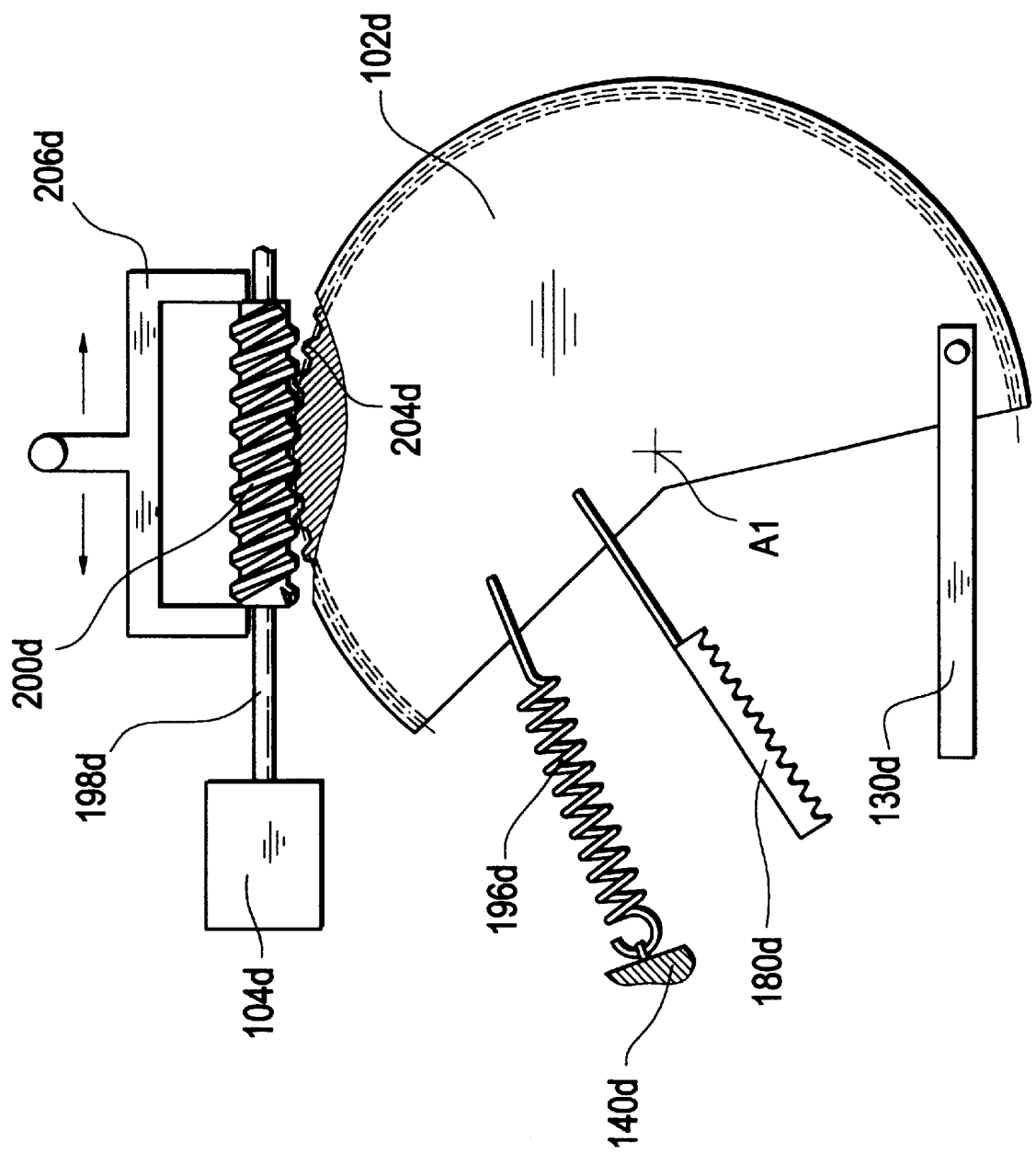
FIG. 18 shows a further embodiment of the portion of the actuating element shown in FIG. 16.

A further modification of the embodiment in FIG. 16 is shown in FIG. 18. Here, the gear rack 180d acts directly on the segment gear 102d. Accordingly, the energy released by the energy storage device 108d is fed via the gear rack 180d directly, without the intermediate connection of the worm gear 200d, to the segment gear 102d.

The embodiment in FIGS. 16 through 18 may also be modified so that the worm gear 200d is connected to the shaft 198d in a rotation-proof and axially secure fashion, while the shaft 198d moves in its longitudinal direction and, as applicable, together with the drive 104d. Moreover, the embodiment can be modified so that the driving connection between the drive 104d and the shaft 198d does not interfere with the axial movement of the shaft 198d. The axial movement of the shaft 198d produced during the rotation of the shaft 198d —induced by the worm gear 200d that meshes with the segment gear 102d —makes it possible to produce a displacement movement of the operating element 168d which may be connected to the shaft 198d for the purpose of common displacement. This obviates the need for the disengagement element 206d.

Figure 19:
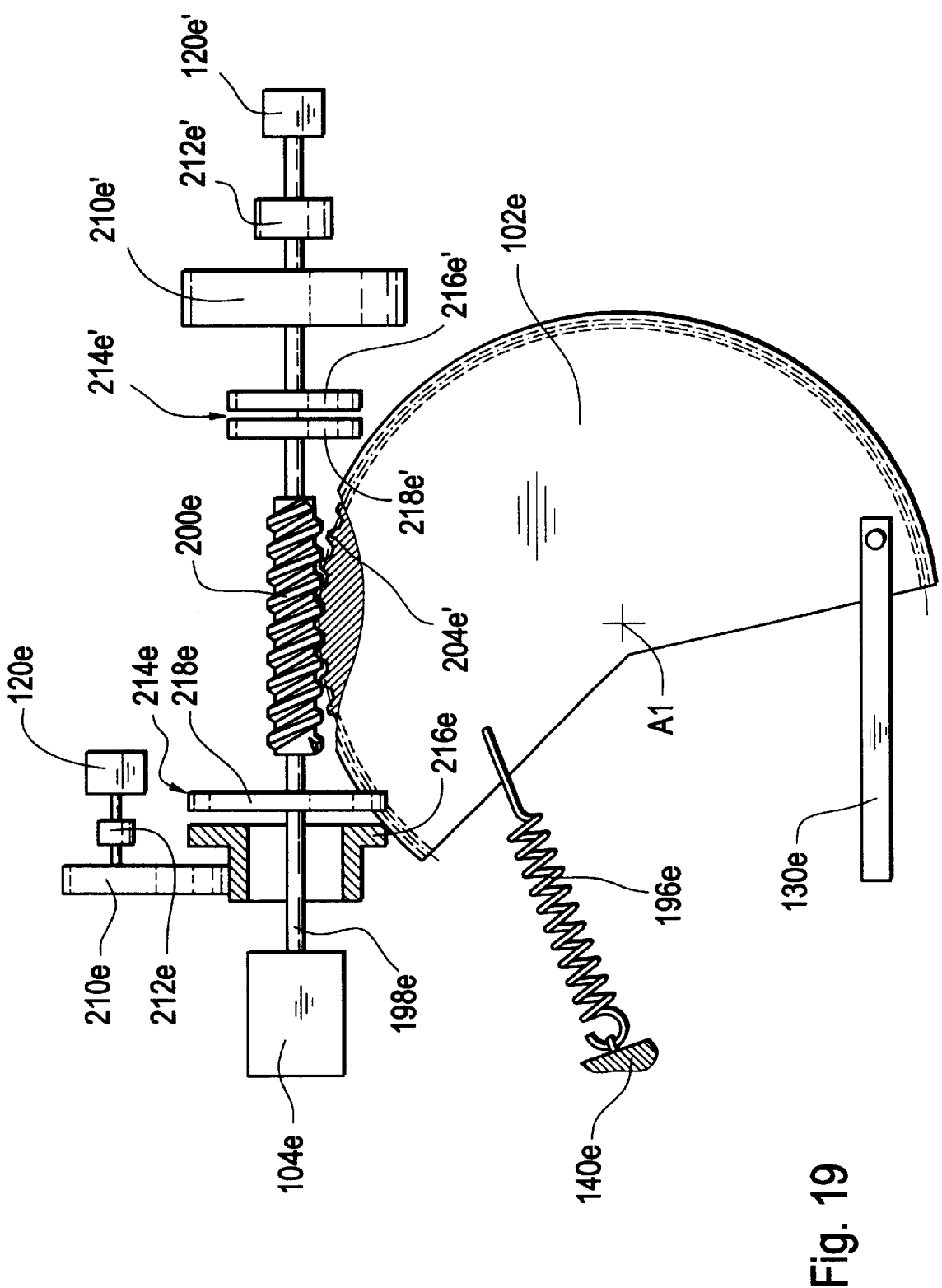
FIG. 19 shows a further embodiment of an actuating element according to the present invention.

An alternative embodiment of an actuating element 100e according to the invention is shown in FIG. 19. Components that correspond in structure and function to components described above are identified by the same reference numbers with an "e" added.

In the embodiment in FIG. 19, a drive 104e is activated to rotate a shaft 198e. The shaft 198e is mounted in an axially displaceable fashion, as described above, and itself carries a worm gear 200e in an axially secure and rotation-proof manner. The actuating element 100e also includes two power storage devices in the form of flywheels or centrifugal masses 210e, 210e '. These centrifugal masses 210e, 210e ' may be rotated by charging drives 120e, 120e ' via freewheel mechanisms 212e, 212e ', respectively. Sides 216e, 216e 40 of coupling arrangements 214e, 214e ' are respectively connected to each of the flywheels 210e, 210e ' for the purpose of common rotation. This connection can be carried out either via intermeshing tooth systems, as in the case of the flywheel 210e ' and the axially stationary coupling part 216e, or via a shaft section, as in the case of the flywheel 210e ' and the axially stationary coupling part 216e '.

The shaft 198e carries complementary or associated coupling parts or disk elements 218e, 218e' in a rotation-proof and axially secure manner. The rotation of the shaft 198e via the drive 104e alone will not suffice to place the segment gear 102e into rotation. Rather, the shaft 198e is axially moved via the worm gear 200e, which intermeshes with the screw-type tooth system 204e of the segment gear 102e, so that, for example, the coupling part 218e is brought into frictional engagement with the coupling part 216e. The rotational energy of the flywheel 210e is then transmitted via this coupling arrangement 214e to the worm gear 200e. Since the worm gear 200e is being held in an axially secure manner, its rotation causes the segment gear 102e to pivot around the pivot axis A1. The drive 104e may be designed so as to be able to produce only the linear displacement of the worm gear 200e. However, it is also possible to embody the drive 104e having larger dimensions, so that it not only supplies the force for engaging one of the coupling arrangements 214e, 214e', but is also able to directly produce a force to drive the segment gear 102e.

In the embodiment of FIG. 19, the energy storage device has two storage areas, namely the flywheel 210e and the flywheel 210e'. Depending on the required operating direction, one of the coupling arrangements 214e, 214e' associated with the storage areas is engaged. Thus, in contrast to the embodiment in FIG. 11, FIG. 19 has two transmitting paths leading to different storage areas. The advantage of this embodiment is that the relatively complex mechanism for optionally changing the rotational direction is not required. Each of the flywheels 210e, 210e' can be driven in the required rotational direction by the associated charging drive 120e, 120e'. The free-wheel mechanisms 212e, 212e' allow the drives 120e, 120e' to be deactivated once the respective flywheels 210e, 210e' have been placed into rotation and reached the required speed. In such an embodiment, it is also possible to feed energy to the energy storage device or storage areas regardless of the current movement state or movement position of the output element 130a or segment gear 102e. This can be done by energizing the individual drives 120e, 120e' as required.

In the embodiment in FIG. 19 as well as in all other embodiments in which a driven segment gear is used, the segment gear and the element driving it, e.g., a worm gear or a toothed gear driven in some other manner, constitute a relatively simply structured gear arrangement. Nonetheless, starting from the energy storage device or the different storage areas of the energy storage device, different energy flow paths can be provided via coupling arrangements and serve, depending on the operating direction, to transmit the previously stored energy to the output element.

Figure 20:
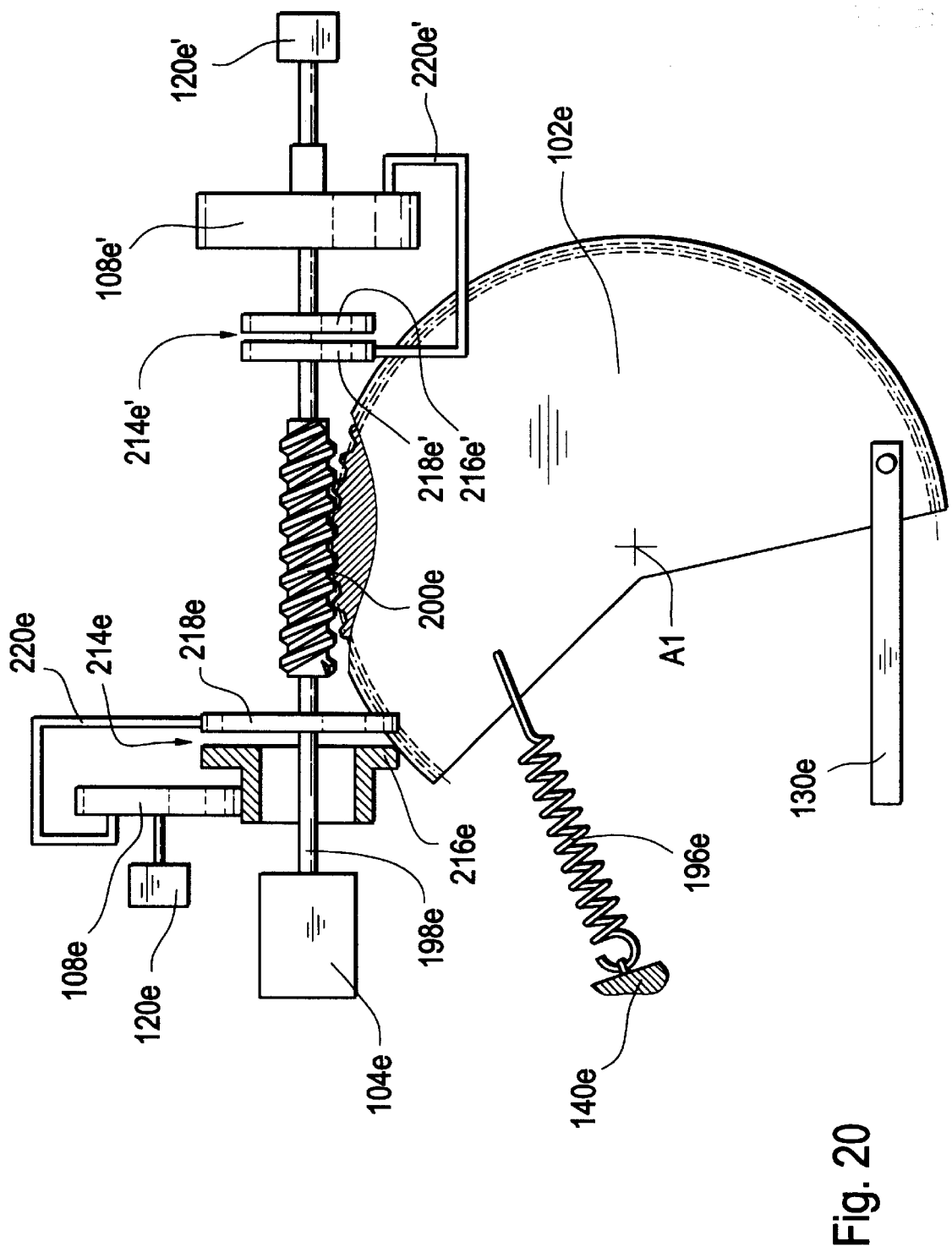
FIG. 20 shows an embodiment of the actuating element in FIG. 19 with a different type of energy storage devices.

A modification of the embodiment shown in FIG. 19 is shown in FIG. 20. Here, instead of the previously indicated flywheels, energy storage devices are once again used, as shown, for example, in FIG. 11. The energy storage devices in this case are helical springs 108e or 108e', which may be stressed the via the associated drives 120e, 120e'. When the prestressed springs 108e, 108e' are used as the energy storage devices, the side components 216e, 216e' are not blocked against rotation in the disengaged state of the two coupling arrangements 214e, 214e'. Accordingly, care must to taken to ensure that in the disengaged state of the two coupling arrangements 214e, 214e', the energy storage devices 108e', 108e' do not discharge in an undesired manner. Therefore, mechanical blocking mechanisms 220, 220e' are provided, which, when the coupling arrangements 214e, 214e' are disengaged, establish a secure mechanical connection between the output side of the energy storage devices 108e, 108e' and the coupling elements 218e, 218e' arranged on the shaft 198e. An axial displacement of the shaft 198e, for example, to the left in FIG. 20 terminates the blocking effect of the blocking mechanism 220e, allowing the energy storage device 108e to transmit its energy via the coupling arrangement 214e to the worm gear 200e and thus to the segment gear 102e. For example, a gearwheel or toothed gear connected to the spiral spring drives the coupling part 216e to rotation. The coupling part 216e' may also be placed into rotation by a gear driven by the spiral spring 108e'.

It should be noted that spiral springs need not necessarily be used as the energy storage devices. Instead, spring arrangements such as those shown in FIGS. 4 through 10 may also be used. In other words, prestressable helical springs, or spring arrangements such as those used in torsional vibration dampers, having multiple spring elements arranged one after the other in the circumferential direction and resting on respective activation areas, may be used.

Figure 21:
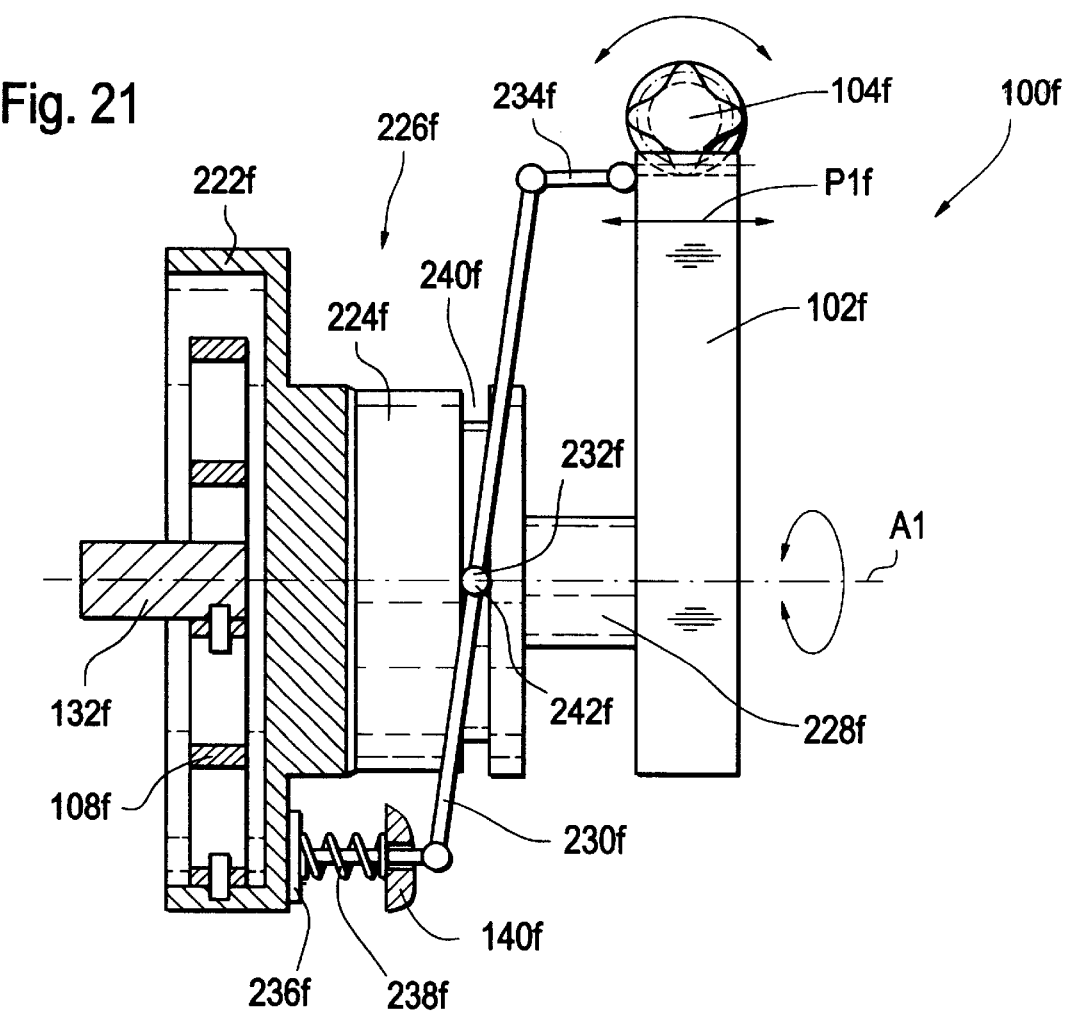
FIG. 21 shows a further embodiment of an actuating element according to the present invention.

FIG. 21 shows another actuating element 100f according to the invention. Components that correspond to previous components with respect to structure and function are identified by the same reference numbers with an "f" added.

The actuating element 100f in FIG. 21 has an energy storage device in the form of a spiral spring 108f having one winding end area securely connected to the shaft 132f that is connected by the charging drive (not shown) and the other winding end area securely connected to a first disk part 222f. Located opposite to and at an axial distance from the first disk part 222f is a second disk part 224f. The first and second disk parts 222f, 224f together form a coupling arrangement 226f. The second disk part 224f is connected via a shaft section 228f to the segment gear 102f. The segment gear 102f, as indicated by the arrow P1, is displaceable along the shaft section 228f. A lever part 230f is mounted on the second disk part 224f in a pivot area 232f so that the lever part 230f is pivotable around an axis running substantially orthogonally to the rotational axis A1. One end area of the lever part 230f is pivotally connected to a pressurization section 234f which acts laterally on the segment gear 102f. The previously described lateral displacement of the segment gear 102f upon energization of the drive 104f causes a pressurization of the pressurization section 234f which leads to the pivoting of the lever part 230f around the pivot axis 232f. The other end area of the lever part 230f is pivotally connected to a blocking element 236f. The blocking element 236f is prestressed by a blocking spring 238f that rests, for example, on a housing 140f. The blocking spring 238f presses the blocking element 236f against the first disk element 222f of the coupling arrangement 226f such that the blocking element 236f acts in a friction-locking or positive-locking manner on the first disk element, for example, by a tooth system. When the segment gear 102f is displaced toward the coupling arrangement 226f, for example, while the blocking engagement of the blocking element 236f is initially maintained by the lever part 230f and its pivot area 232f (which can consist, for example, of a pivot pin element 242f connected to the lever part 230f and engaging into a circumferential groove 240f of the disk part 224f), the coupling arrangement 226f is first brought into a coupling state in which the first and second disk elements 222f, 224f are located one atop the other. When further movement of the second disk element 224f is prevented by abutment with the first disk element 222f, further displacement of the segment gear 102f elevates the blocking element 236f from the first disk element 222f, so that the energy storage device 108*f* is now able to release energy to the segment gear 102*f*. If the drive 104 is deenergized, the prestress of the blocking spring 238*f* initially presses the blocking element 236*f* in blocking engagement against the first disk element 222*f*. The segment gear 102 moved back and the coupling state of the coupling arrangement 226*f* is again terminated. Because the energy storage device 108*f* is thus provided against relaxation or energy release, the spiral spring 108*f* and the components rotating therewith are slowed down before the coupling arrangement 226*f* is brought into a disengaged state so that the rotational energy is nullified and an overshooting of the system past the desired position of the segment gear is avoided.

Figure 22:
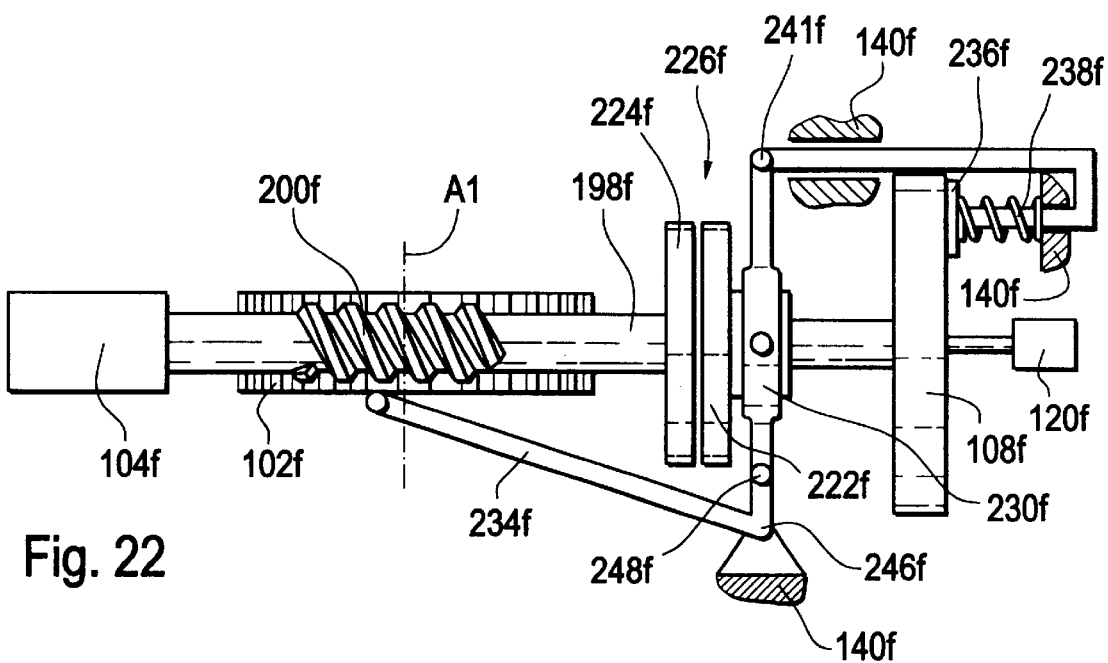
FIG. 22 shows an embodiment of the actuating element shown in FIG. 21.

Furthermore, in this embodiment, the segment gear 102*f* supported directly, although only in one rotational direction, by the energy storage device 108*f*. To obtain operating support in both directions, the same arrangement may be provided on the other side (i.e., the right side in FIG. 21) of the segment gear 102*f*, so that, depending on the displacement movement of the segment gear 102*f*, one of the two energy storage devices is allowed to release energy. Particularly in an embodiment of this type, it is possible to open a given coupling only when the segment gear 102*f* rotates in a different rotational direction, i.e., when the segment gear is driven via a different coupling arrangement.thanks A modification of this embodiment is shown in FIG. 22. In this case, the coupling arrangement 226*f* and the first and second disk elements 224*f* and 222*f* are arranged so that the rotational energy of the energy storage device 108*f* is conducted directly to the shaft 198*f* that carries the worm gear 200*f*. The pressurization element 234*f* is embodied as a lever and, for example, is pivotally mounted on the housing 140*f* in a pivot bearing area 246*f*. In a first pivotconnection area 248*f*, the lever part 230*f* is pivotally connected to the pressurization element 234*f*. In a second connection area 241*f*, the lever part 230*f* is pivotally connected to the blocking element 236*f* which runs, for example, in the housing 140*f*. Pivoting the segment gear 102*f*, upon energization of the drive 104*f*, or displacement of the segment gear 102*f* downward in FIG. 22, causes the pressurization element 234*f* to pivot in the counterclockwise direction. The first disk element 222*f* is then pressed against the second disk element 224*f* and the coupling arrangement 226*f* is brought into the engaged state. When reciprocal contact of the first and second disk elements 222*f* and 224*f* is attained, further displacement or pivoting of the segment gear 102*f* moves the initially stationary pivot-connection area 241 such that the blocking element 236*f* elevates from the energy storage device 108*f* or a disk part connected thereto against the effect of the blocking spring 238*f*.

To obtain a supporting force in both operating directions, a further arrangement of this type may be connected to the shaft 198*f* at the opposite end of the shaft 198*f*, so that, depending on the direction in which the segment gear 102*f* is pivoted or displaced, one of the power storage devices conducts energy to the worm gear 102*f* via an associated coupling arrangement.

In the embodiments shown in FIGS. 21 and 22, the movement drive 104*f*, which also serves as the operating drive for engaging and disengaging the coupling arrangements, may be designed such that it applies only a force required for disengagement and engagement or may be designed such that it also provides a supporting force for pivoting the segment gear 102*f* around the pivot axis A1. Moreover, the energy storage device(s) can be embodied differently, e.g., with helical compression springs, as shown in FIG. 10, or with flywheels.

Figure 23:
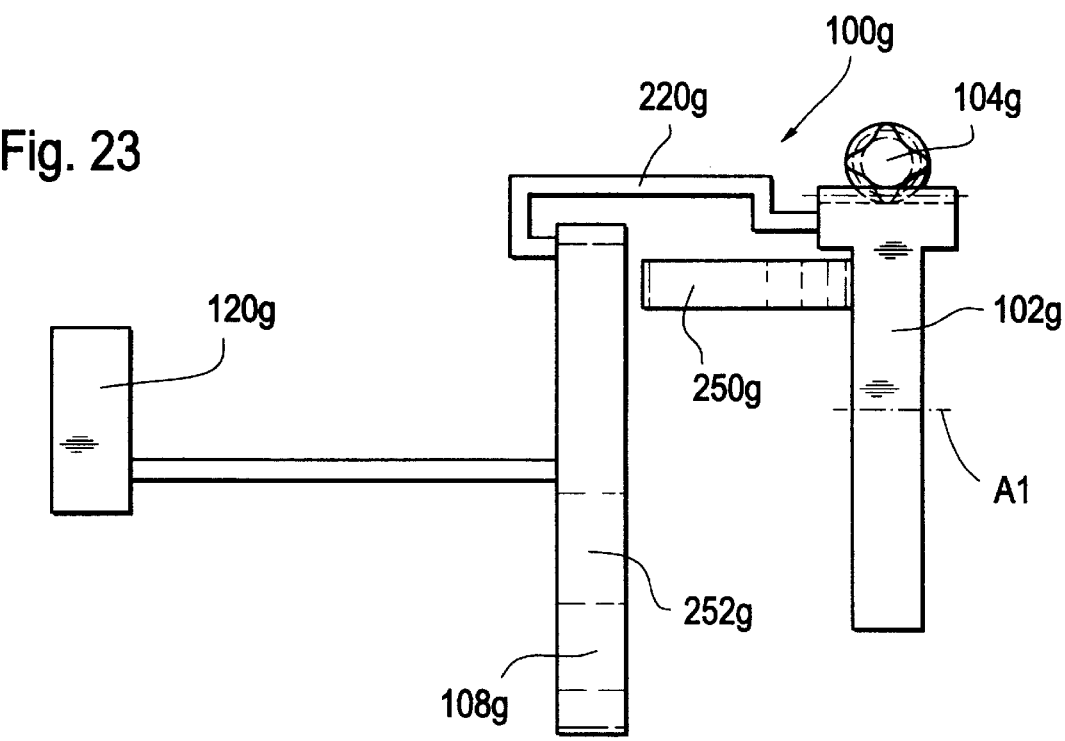
FIG. 23 shows a further embodiment of an actuating element according to the present invention.

A further embodiment of an actuating element 100*g* according to the invention is shown in FIG. 23. Components that correspond in structure and function to components described above are identified by the same reference numbers with a "g" added.

A segment gear 102*g* of the actuating element 100*g* is laterally movable or pivotable upon energization of the drive 104*g* for pressing a transmitting gear 250*g* against a disk element 252*g*. The disk element 252*g*, may be rotated by an energy storage device in the form of a spiral spring 108*f* Upon the lateral pivoting of the segment gear 102*g*, a blocking device 220*g* is elevated from the energy storage device 108*g* or disk element 152*g*, so that the previously blocked energy storage device 108*a* drives the segment gear 102*g* (either to support the drive 104*g* or as the sole drive) via the transmitting gear 250*g*. To obtain two operating directions, an identical arrangement may be provided on the other axial side of the segment gear 102*g*, so that, depending on which of the transmitting gears 250*g* (which form a coupling arrangement) is brought into contact with the associated energy storage device 108*g*, the segment gear 102*g* may be operated in different directions. It is also possible for the energy storage device used here to comprise a flywheel, which can be placed into rotation by the associated drive 120*g*. In this case, the blocking device 220*g* may be dispensed with.

Particularly when a flywheel is used as the energy storage device, and even in the case of a single flywheel, operation in two directions can be obtained when the charging drive associated with the energy storage device is designed to drive the centrifugal mass in different rotational directions. There could then be a particular timepoint at which a minimum quantity of energy is stored in the energy storage device. For example, after an operational procedure has been implemented, and, when operation in the opposite direction is expected, the drive could slow down the flywheel and then drive the flywheel in the opposite direction so that the actuating element is ready for the next expected move.

Figure 24:
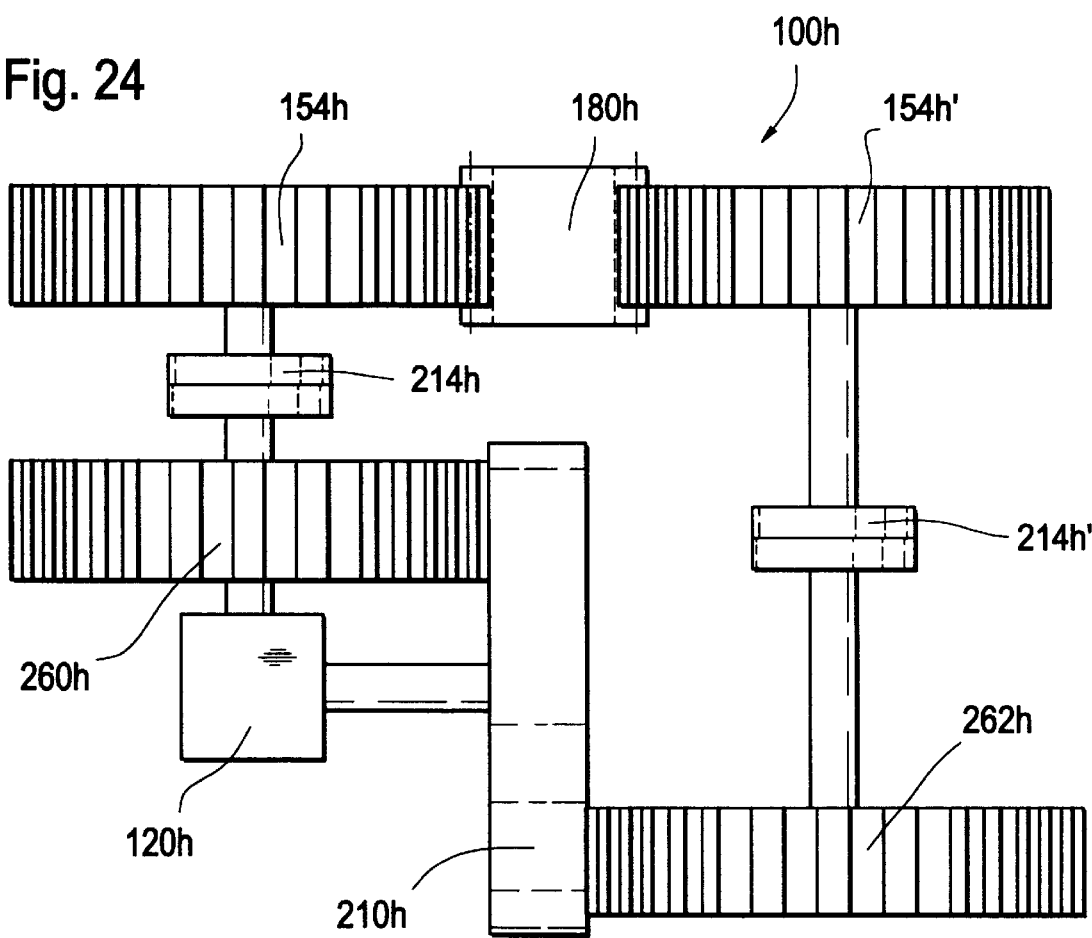
FIG. 24 shows a further embodiment of an actuating element according to the present invention.

A further embodiment of an actuating element 100*h* according to the invention is shown in FIG. 24. Components that correspond in structure and function to components described above are identified by the same reference numbers with an "h" added.

The actuating element 100*h* comprises a flywheel 210*h* as the energy storage device that may be placed into rotation about axis A1*h* by a charging drive 120*h*. The flywheel 210*h* is acted upon, either flatly or via toothing, for example, by two transmitting gears 260*h*, 262*h*. Upon rotation of the flywheel 210*h*, the two transmitting gears 260*h*, 262*h* are rotated in opposite rotational directions by the flywheel 210*h*. Two coupling arrangements 214*h*, 214*h* ', for example, in the form of disks are pressable against and separable from each other by a suitable disengagement mechanisms. The disks of the two coupling arrangements 214*h*, 214*h* ' conduct the rotation of the transmitting gears 260*h*, 262*h* to respective output gears 154*h*, 154*h* ' and from there to an output element such, for example, as a gear rack 180*h*. When both coupling arrangements 214*h*, 214*h* ' are in the open state, the energy flow to the gear rack 180*h* is interrupted. When one of the coupling arrangements 214*h*, 214*h* ' is engaged, the gear rack 180*h* moves linearly in the corresponding direction. Again, a spring arrangement, e.g., a spiral spring, may also used as the energy storage device instead of the flywheel 210*h*. The energy flow can then be interrupted by both coupling arrangements 214*h*, 214*h* ' being brought into the engaged state, as described above in reference to FIG. 11.

It should be noted that in the different embodiments, the illustrated gear rack 180 may be used, as shown, to transmit a force to a segment gear or similar element, whereby an output element is driven by the segment gear or the gear rack 180 may directly comprise the output element. Further, it should again be pointed out that, when a spring arrangement is used as an energy storage device, this can take the form of a spiral spring, a helical spring prestressed to torsion, or a spring arrangement with at least one axially compressible spring, as shown in FIG. 10.

Figure 25:
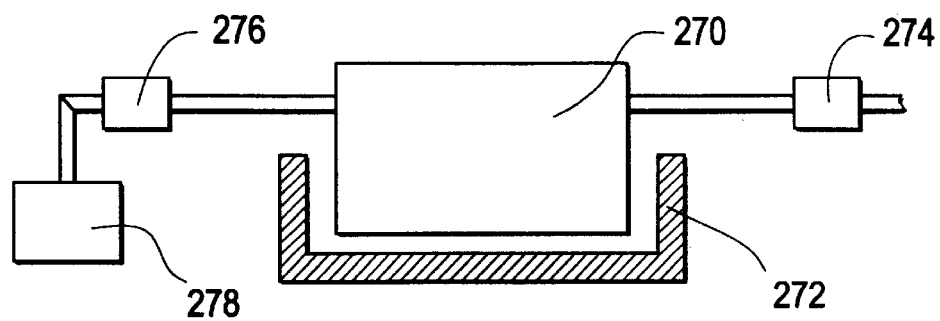
FIG. 25 shows a thermal energy storage device that may be used with the actuating element according to the present invention.

As a matter of principle, other types of energy storage device may also be used. As an example, FIG. 25 shows a thermal energy storage device in which air or another gas is contained in a pressure storage device 270 which may be heated by a heating device 272. The resulting increased pressure in the pressure storage device 270 is releasable via a valve 274 to produce an operating force. Via a further valve 276 and a pump 278, cooling air may be added, and heated again in the pressure storage device 270. It should be noted that the air or gas may be replaced by fluid, which is supplied from a collection container (not shown).

The released pressurized air can, for example, act upon a piston element to linearally move the latter with the gear rack, or can drive a turbine wheel in a turbine arrangement to produce rotational energy.

Figure 26:
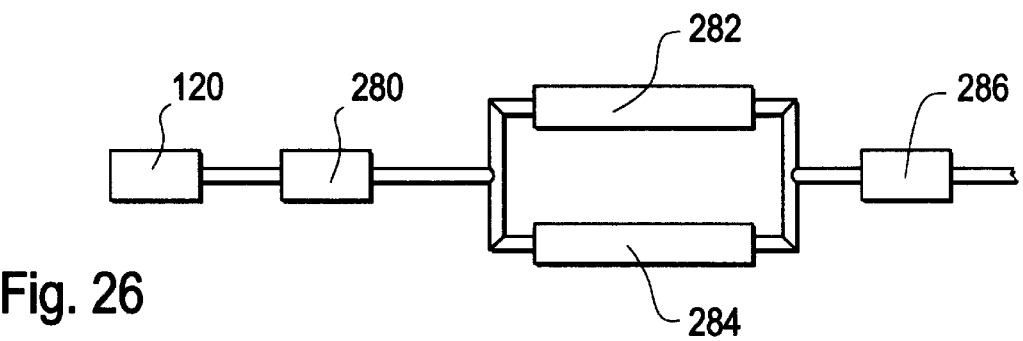
FIG. 26 shows an electric energy storage device that may be used with the actuating element according to the present invention.

FIG. 26 shows an embodiment of the energy storage device comprising an electric device. A generator 280 is driven by a charging drive 120, and either stores energy in an accumulator 282 or uses it to charge a capacitor 284. Electric power from the accumulator 282 or capacitor 284 may then be conducted via a coil 286. The power flow can be allowed or interrupted by an activation element (not shown). The magnetic force produced by the coil 286 may be used to move an output element. The charging of the accumulator 282 or capacitor 284 could also be carried out, for example, by solar cells or via a battery provided in a motor vehicle.

Figure 27:
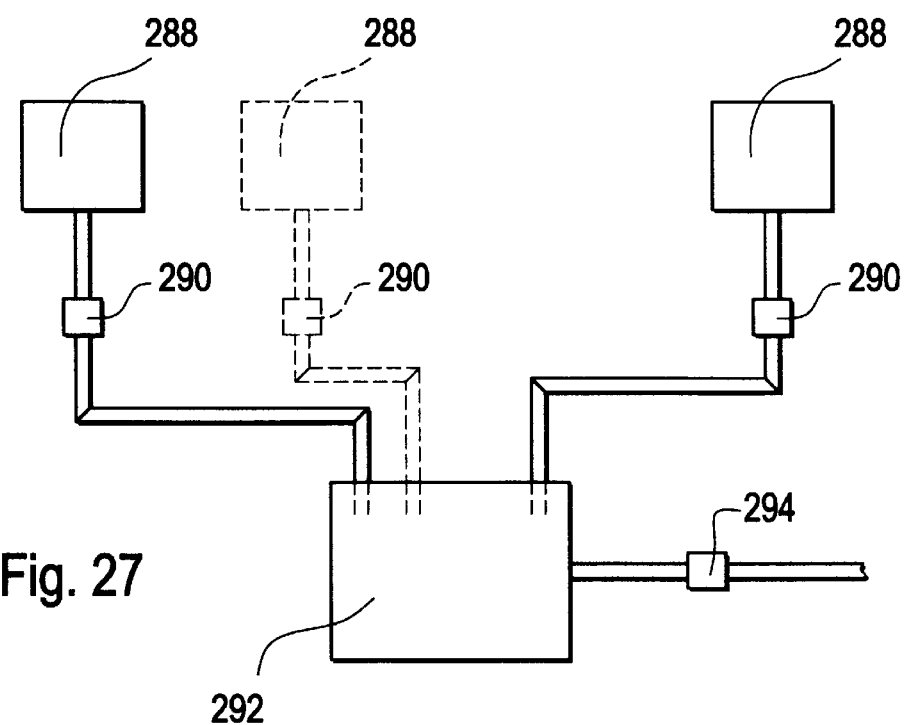
FIG. 27 shows a chemical energy storage device that may be used with the actuating element according to the present invention.

A further embodiment of an energy storage device comprising a chemical storage device is shown in FIG. 27. The chemical storage device comprises multiple containers 288 the contents of which may be brought via valves 290 into connection with a mixing container 292. By opening various ones of the valves 290, it is possible for the substances contained in the various containers 288 to flow into the mixing container 292 and there trigger a chemical reaction, during which, for example, gas is produced. A pressure increase then occurs in the mixing container. Upon the opening of a further valve 294, the pressure in the mixing container 292 is released, for example, to move a piston for the purpose of producing a supporting or operating force or to drive a turbine for the purpose of producing a rotational force, which can then be transmitted directly or via a gear arrangement to an output element, as described above. It should further be noted that the reaction occurring in the mixing container 292 may encompass a thermally exogenous processes, during which heat is created, after which pressure can be created by the heat.

Figure 28:
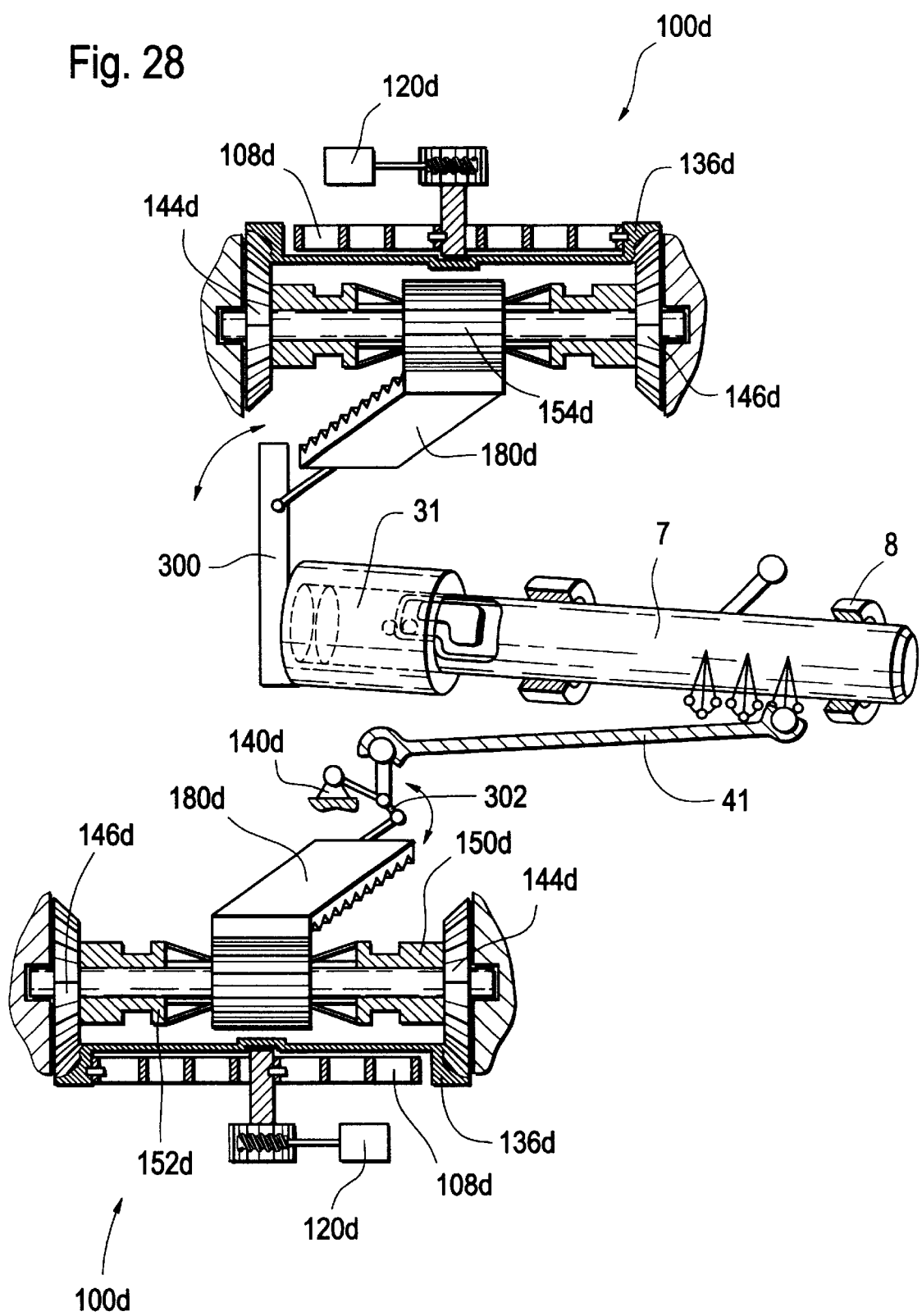
FIG. 28 shows an actuating device having a selector shaft as in FIG. 1 and two actuating elements as in FIG. 11.

FIG. 28 shows the use of the actuating element 100d from FIG. 11 in connection with a selector shaft 7, as shown in FIG. 1. In this embodiment, the sleeve 31 is pivoted around the longitudinal axis of the selector shaft 7 by the actuating element 100d1 shown in the top part of the drawing. To accomplish this connection, a lever 300 connected to the gear rack 180d 1 rotates the sleeve 31 in response to a displacement direction of the gear rack 180d 1. The actuating element 100d2 shown in the bottom part of FIG. 28 acts, via the gear rack 180d 2 and the lever 302 (which is pivotably mounted in a first end area, e.g., on the housing 140d, and is connected in the second end area to the gear rack 180d 2), on the lever 41 connected in pivotable fashion to the selector shaft 7.

In this way, the same function is obtained during the movement of the selector shaft 7 as was described above in reference to FIG. 1.

It should also be noted that in the embodiment shown in FIG. 28, the two actuating elements 106d 1, 106d 2 have the respective transmitting gears 144d 1, 144d 2 and 146d 1, 146d 2 which can roll on the driving gear 136d 1, 136d 2 and do not intermesh with the latter in a beveled manner, as shown in FIG. 11. However, a tooth-type engagement is also possible here.

FIGS. 29 through 33 illustrate different connections of an actuating element according to the invention to a unit to be operated such, for example, as a clutch 310. FIG. 29 shows the gear rack 180d connected to a piston rod 312 of an input cylinder 314. Pressure is transmitted from the input cylinder 314 to be transmitted to the output cylinder 316, whose piston rod 318 then pressurizes a disengagement mechanism 320 of the clutch 310. In this case, the gear rack 180d comprises the output element of the actuating element. It is also conceivable to connect the output element 130d shown in the drawings, which is driven for the purpose of movement by a segment gear, to the piston rod 312 of the input cylinder 314. In the embodiment in FIG. 30, the output element, for example, the gear rack 180d, is connected directly to the disengagement mechanism 320 and displaces the latter directly, without any intermediate connection of a fluid-operated path. FIG. 31 schematically illustrates the embodiment described in reference to FIG. 18. Here, the gear rack 180d, which can be seen, for example, in FIG. 11, acts on the segment gear 102d, and the pivoting of the segment gear 102d produces movement of the follower 130d that forms the output element. The compensation spring 196d supplies a further supporting force conducted parallel to the action of the gear rack 180d to the segment gear 102d. Because the effective active lever of the gear rack 180d and the compensation spring 196d changes in dependence on the pivot position of the segment gear 102d, adjustment to the force curve of the part to be operated such, for example, a diaphragm spring, is possible.

In FIG. 32, the gear rack 180d and the compensation spring 196d act in parallel fashion on the piston rod 312 of the input cylinder 314. Here, a linear force ratio exists, i.e., there is no changing translation or reduction process as the result of changing lever ratios. FIG. 33 shows an alternative connection of the gear rack 180d or the compensation spring 196d to the disengagement mechanism 320, without any intermediate connection of a fluid-operation path.

Figure 34:
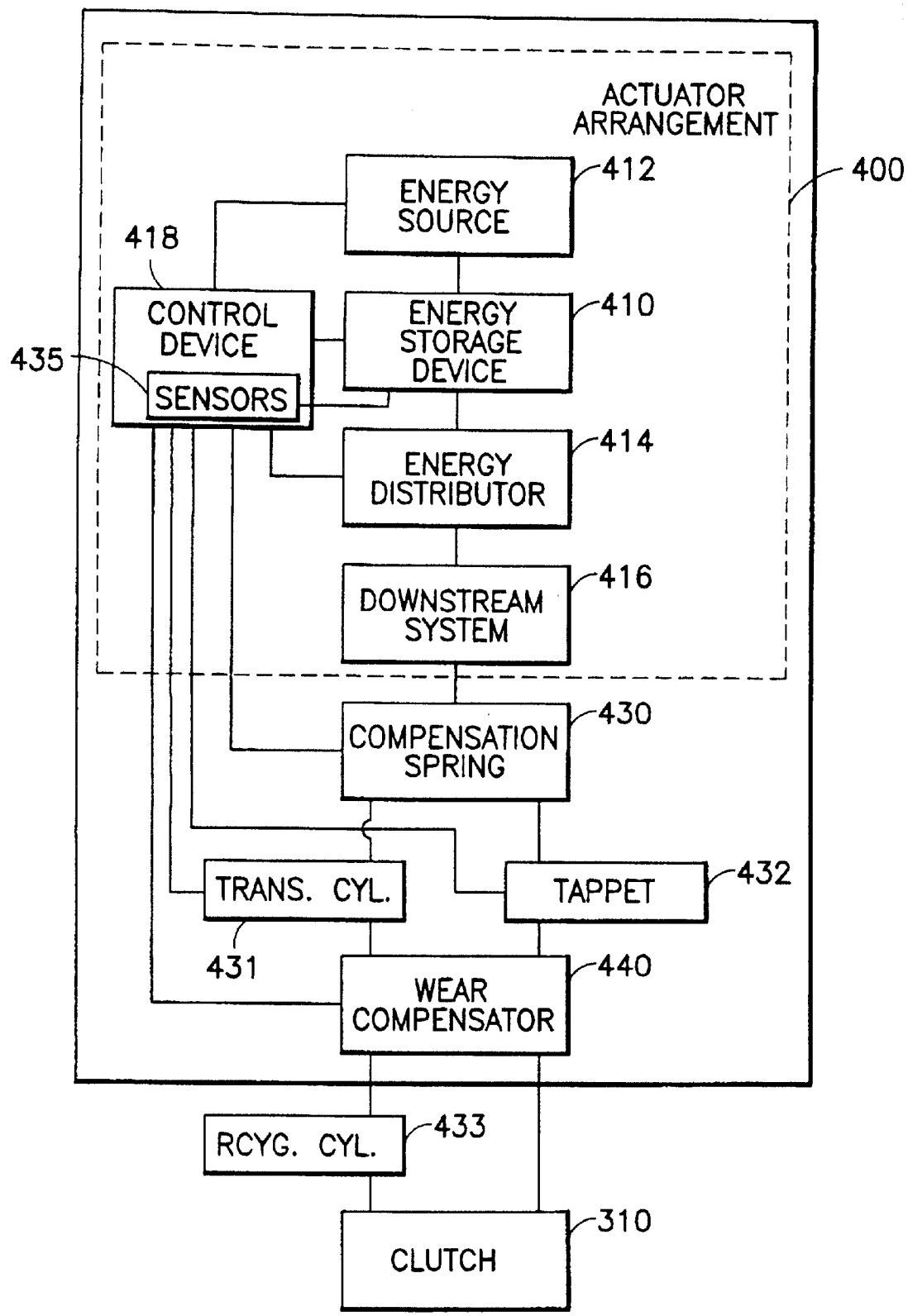
FIG. 34 is a block diagram showing the function of an actuating element according to the invention.

FIG. 34 is a block diagram illustrating the basic structure or functional principle of an actuator arrangement 400 according to the present invention. An energy storage device 410 has associated with it an energy source 412. When the energy storage device 410 is embodied as a flywheel or a stressable spring arrangement, the energy source 412 may comprise, for example, a charging drive. If the energy storage device 410 comprises a thermal storage device, the energy source 412 comprises a heating device or electric power supplied to the heating device. The energy stored in the energy storage device 410 may be transmitted via an energy distributor 414 to a downstream system 416. The energy distributor 414 may comprise the depicted gear arrangements or coupling arrangements and the downstream system 416 may comprise the gear rack or may directly comprise the segment gear. All of these components are controllable by a control device 418 which may obtain information via a sensor system 435 on the current status of the particular units. It is particularly advantageous to obtain information about how much energy is still stored in the energy storage device 410, so that, when a certain minimum value is dropped below, energy can be recharged from the energy source 412, regardless of the current operating state of the actuator as a whole. In this way, multiple operating procedures may be carried out one after another which is especially useful when the device is used to change gears in a transmission. The device may be operated solely on the energy released from the energy storage device 410, or may also be operated by a movement drive. Further, a compensation spring 430 is optionally connected for supplementing the energy storage device 410 and, when used, for example, with clutch operating devices, is again stressed-and thus charged-during engagement of the clutch, by the energy released by the diaphragm spring of the clutch. Such a compensation spring 430 provides coupling force compensation that, as described in reference to FIGS. 31 through 33 may occur either linearly or non-linearally. Further, the energy may optionally be conducted via a fluid system with a transmitting (input) cylinder 431 and a receiving (output) cylinder 433 to the part to be operated, e.g., a clutch 310, or can be conducted directly to the clutch via a mechanical connection, e.g., the follower 130*d* or the gear rack 180*d*. It is also possible to integrate a wear compensation device 440 into the force transmission path between the gear rack or the follower, for example, by using a wearcompensating follower such as a tappet 432, or, when a fluid transmission system is used, to integrate a wear compensation function by providing a snifter boring in the input cylinder 431 as well as a fluid compensation container.

All of the previously described actuating elements, in which the energy storage device can be supplied with energy in any operating positions or operating states, can be integrated into a drive of this type, which is shown schematically in FIG. 34. The possibility of recharging the energy storage device at any time, especially when a minimum energy storage value is fallen below, opens a wide variety of applications. In addition, this recharging possibility opens the option of performing emergency operations, namely, when further charging is no longer possible due to some defect. In this case, the energy still remaining can be used to at least bring the unit to be operated into a state in which the entire system, e.g., a motor vehicle, is impaired as little as possible by this defect.

Particularly in the embodiments comprising a segment gear with a worm drive, it is possible to use the self-locking effect to block the energy output from the energy storage device when the segment gear is not being driven by the operating drive. Other types of gears may also be embodied in a self-locking manner.

Because the energy required to carry out operating procedures is already being kept available in a storage device, it is possible to achieve a high operating dynamic, whereby the operating curve can be very well regulated, particularly with the described actuating elements. Because relatively weak drives that need not be able to spontaneously produce a large torque can be used to implement the charging process, the entire system can be economically constructed.

The invention is not limited by the embodiments described above which are presented as examples only but can be modified in various ways within the scope of protection defined by the appended patent claims.

We claim:

1. An actuating device for the automatic operation of a gear change in a standard transmission having a plurality gears corresponding to a plurality of translation ratios arranged in a shifting gate having at least two shift paths, said actuating device comprising:

a rotatably and axially movable selector shaft operatively connectable to said transmission for selecting one of the plural gears, said movable selector shaft being movable in a first direction and a second direction, said first direction comprising one of rotation direction and an axial direction and said second direction comprising the other one of said rotation direction and said axial direction;

a guide mechanism arranged on said selector shaft comprising at least one constraint guide defining a movement path of said selector shaft for effecting a gear change between two of said plural gears, said movement path requiring a movement of said selector shaft in said first direction and a movement of said selection shaft in said second direction;

a first drive operatively connected to said selector shaft via said guide mechanism and individually actuatable for moving said selector shaft in said first direction; and a second drive operatively connected to said selector shaft for providing an operating force having a first force component along an axial direction of said selector shaft and a second force component along a circumferential direction of said selector shaft, said second drive being individually actuatable for moving said selector shaft both said axial direction and said rotation direction along said movement path for effecting said gear change while said first drive and said guide mechanism remain in a fixed position.

2. The actuating device of claim 1, wherein said first drive is operatively connected for activating said at least one constraint guide to be passed through during said gear change.

3. The actuating device of claim 1, wherein said first drive is activatable for initiating a movement of said at least one constraint guide during a movement of said selector shaft to ensure a shifting movement of said selector shaft other than said movement path corresponding to said at least one constraint guide.

4. The actuating device of claim 1, wherein said selector shaft is connectable in a shifting gate of the transmission having gears arranged in at least two shifting path positions, said at least one constraint guide of said guide mechanism corresponding to a gear shift path with a change between the shifting path positions.

5. The actuating device of claim 4, wherein along said at least one constraint guide corresponds to a gear change occurring within one shifting path position.

6. The actuating device of claim 4, wherein said at least one constraint guide comprises a first constraint guide for a gear change with a change in shifting path positions and a second constraint guide for a gear change that maintains the shifting path position.

7. The actuating device of claim 6, wherein said guide mechanism comprises a slot and a projection engaged in said slot and said slot comprises a first section corresponding to said first constraint guide and a second section corresponding to said second constraint guide.

8. The actuating device of claim 1, wherein said guide mechanism comprises a slot and a projection engaged in said slot and said slot comprises a closed slotted guideway.

9. An actuating device for the automatic operation of a gear change in a standard transmission having a plurality gears corresponding to a plurality of translation ratios, comprising:

a rotatably and axially movable selector shaft operatively connectable to said transmission for selecting one of the plural gears;

a first drive operatively connected to said selector shaft via a guide mechanism, said guide mechanism comprising at least one constraint guide corresponding to a shifting path of said selector shaft for effecting a gear change between two of said plural gears; and a second drive operatively connected to said selector shaft for providing an operating force having a first force component along an axial direction of said selector shaft and a second force component along a circumferential direction of said selector shaft for urging said selector shaft along a movement path determined by an operating position of said guide mechanism, said guide mechanism further comprising an input part connected to said first drive and an output part in active connection with said input part, wherein said first drive is operatively connected to said input part of said guide, mechanism via an intermediate connection of a transmitting device, wherein said transmitting device comprises a self-locking mechanism.

10. The actuating device of claim 9, wherein said input part is mounted on said selector shaft.

11. An actuating device for the automatic operation of a gear change in a standard transmission having a plurality gears corresponding to a plurality of translation ratios, comprising:

a rotatably and axially movable selector shaft operatively connectable to said transmission for selecting one of the plural gears;

a first drive operatively connected to said selector shaft via a guide mechanism, said guide mechanism comprising at least one constraint guide corresponding to a shifting path of said selector shaft for effecting a gear change between two of said plural gears; and a second drive operatively connected to said selector shaft for providing an operating force having a first force component along an axial direction of said selector shaft and a second force component along a circumferential direction of said selector shaft for urging said selector shaft along a movement path determined by an operating position of said guide mechanism, wherein said guide mechanism comprises an input part connected to said first drive and an output part in active connection with said input part, said guide mechanism further comprising a slot and a projection engaged in said slot, said projection engaging said slot comprises a bolt formed as an integral unit with said selector shaft, and said slot comprises a part of said input part of said guide mechanism.

12. An actuating device for the automatic operation of a gear change in a standard transmission having a plurality gears corresponding to a plurality of translation ratios, comprising:

a rotatably and axially movable selector shaft operatively connectable to said transmission for selecting one of the plural gears;

a first drive operatively connected to said selector shaft via a guide mechanism, said guide mechanism comprising at least one constraint guide corresponding to a shifting path of said selector shaft for effecting a gear change between two of said plural gears; and a second drive operatively connected to said selector shaft for providing an operating force having a first force component along an axial direction of said selector shaft and a second force component along a circumferential direction of said selector shaft for urging said selector shaft along a movement path determined by an operating position of said guide mechanism, wherein at least one of said first drive and said second drive comprises an actuating mechanism drive for producing an operating force applicable to the part to be operated, a supporting spring unit operatively connected for producing a supporting force that supplements said operating force for the part to be operated, and a prestress arrangement operatively connected to said supporting spring for changing a prestress state of said supporting spring unit before production of an operating force of the part to be operated via said actuating mechanism drive.

\* \* \* \* \*